(12) United States Patent
Yu et al.

(10) Patent No.: US 9,912,870 B2
(45) Date of Patent: Mar. 6, 2018

(54) METHOD FOR TRANSMITTING IMAGE AND IMAGE PICKUP APPARATUS APPLYING THE SAME

(75) Inventors: Seung-dong Yu, Osan-si (KR); Woo-yong Chang, Yongin-si (KR); Se-jun Park, Yongin-si (KR); Min-jeong Moon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 69 days.

(21) Appl. No.: 12/862,443

(22) Filed: Aug. 24, 2010

(65) Prior Publication Data
US 2011/0043643 A1 Feb. 24, 2011

(30) Foreign Application Priority Data

Aug. 24, 2009 (KR) .................. 10-2009-0078239
Aug. 24, 2009 (KR) .................. 10-2009-0078263

(51) Int. Cl.
*H04N 5/228* (2006.01)
*H04N 5/222* (2006.01)
(Continued)

(52) U.S. Cl.
CPC ..... *H04N 5/23293* (2013.01); *H04N 1/00209* (2013.01); *H04N 1/00212* (2013.01); *H04N 1/00307* (2013.01); *H04N 2101/00* (2013.01); *H04N 2201/0084* (2013.01); *H04N 2201/3205* (2013.01); *H04N 2201/3225* (2013.01); *H04N 2201/3273* (2013.01)

(58) Field of Classification Search
CPC ........... H04N 5/23293; H04N 1/00212; H04N 1/00209; H04N 1/00307; H04N 2201/3205; H04N 2201/3225; H04N 2201/0084; H04N 2201/3273; H04N 2101/00
See application file for complete search history.

(56) References Cited

U.S. PATENT DOCUMENTS 8,027,541 B2 * 9/2011 Hua ..................... G06K 9/6251
382/118
8,150,208 B2 * 4/2012 Misawa ............ G06K 9/00228
382/118
(Continued)

FOREIGN PATENT DOCUMENTS

CN 1510956 7/2004
CN 101159805 4/2008
(Continued)

OTHER PUBLICATIONS

Chinese Office Action dated Oct. 20, 2014 issued in counterpart application No. 201080038034.X.
(Continued)

*Primary Examiner* — Lin Ye
*Assistant Examiner* — John H Morehead, III
(74) *Attorney, Agent, or Firm* — The Farrell Law Firm, P.C.

(57) ABSTRACT

An image transmitting method and a photographing apparatus using the same are provided. According to the image transmitting method, a face included in an image is recognized and contents to be transmitted or a transmission destination is determined using a recognized face. Accordingly, a user may transmit a photographed image to another person easily using the photographing apparatus.

31 Claims, 51 Drawing Sheets

(51) Int. Cl.
*H04N 5/232* (2006.01)
*H04N 1/00* (2006.01)
*H04N 101/00* (2006.01)

(56) References Cited

U.S. PATENT DOCUMENTS

| | | | |
|---|---|---|---|
| 8,204,270 B2 | 6/2012 | Tanigawa et al. | |
| 8,620,019 B2 | 12/2013 | Tanigawa et al. | |
| 2004/0119826 A1 | 6/2004 | Yunokl | |
| 2007/0086773 A1 | 4/2007 | Ramsten et al. | |
| 2007/0268309 A1 | 11/2007 | Tanigawa et al. | |
| 2008/0068456 A1* | 3/2008 | Fujii | G06F 17/3025 348/130 |
| 2008/0309617 A1* | 12/2008 | Kong | G06F 3/04817 345/157 |
| 2008/0309788 A1* | 12/2008 | Onozawa | H04N 5/232 348/222.1 |
| 2009/0006484 A1* | 1/2009 | Wang | G06F 17/30247 |
| 2009/0051787 A1 | 2/2009 | Yoon et al. | |
| 2009/0091650 A1* | 4/2009 | Kodama | H04N 5/232 348/333.11 |
| 2009/0256925 A1* | 10/2009 | Yoshizumi | G06K 9/00221 348/222.1 |
| 2009/0268888 A1* | 10/2009 | Hsu | H04M 1/27455 379/93.23 |
| 2010/0056188 A1* | 3/2010 | Super | H04M 1/72555 455/466 |
| 2010/0216441 A1* | 8/2010 | Larsson | G06F 17/30265 455/415 |
| 2010/0317398 A1* | 12/2010 | Thorn | G03B 15/02 455/556.1 |
| 2011/0125770 A1* | 5/2011 | Battestini | G06Q 10/00 707/758 |
| 2011/0267368 A1* | 11/2011 | Casillas | G06F 17/30247 345/629 |
| 2011/0280447 A1* | 11/2011 | Conwell | G06F 17/30265 382/103 |
| 2012/0321196 A1 | 12/2012 | Tanigawa et al. | |

FOREIGN PATENT DOCUMENTS

| | | |
|---|---|---|
| CN | 101288042 | 10/2008 |
| EP | 1 432 226 | 6/2004 |
| KR | 1020030018998 | 3/2003 |
| KR | 1020040023235 | 3/2004 |
| KR | 1020040046734 | 6/2004 |
| KR | 1020050098427 | 10/2005 |
| KR | 1020060080995 | 7/2006 |
| KR | 1020070064999 | 6/2007 |
| KR | 1020090001848 | 1/2009 |
| KR | 1020090020390 | 2/2009 |
| KR | 1020090056591 | 6/2009 |
| WO | WO 2007/042460 | 4/2007 |
| WO | WO 2009/004524 | 1/2009 |

OTHER PUBLICATIONS

Chinese Office Action dated May 8, 2015 issued in counterpart application No. 201080038034.X.

Korean Office Action dated Jul. 23, 2015 issued in counterpart application No. 10-2009-0078239.

* cited by examiner

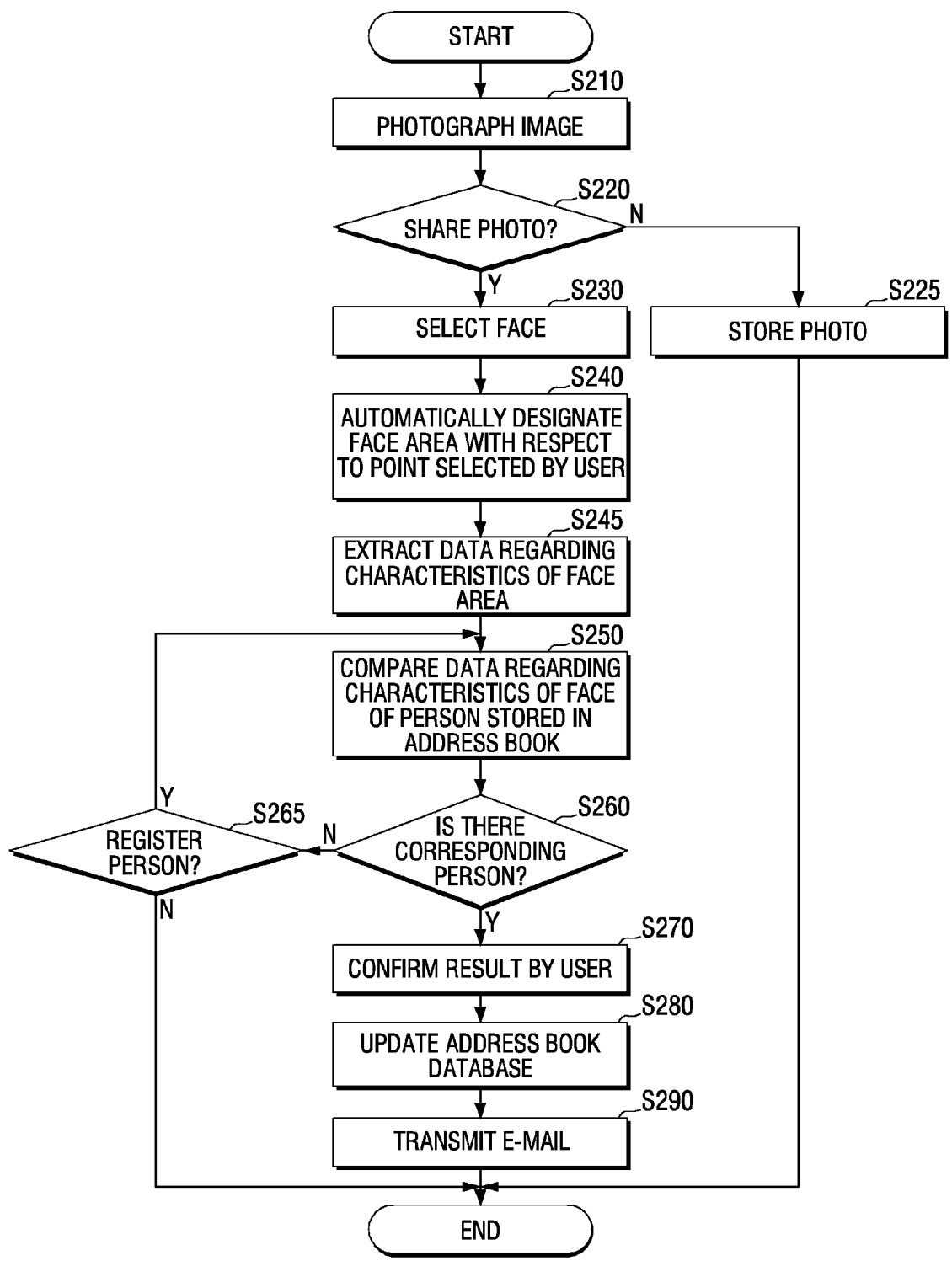

METHOD FOR TRANSMITTING IMAGE AND IMAGE PICKUP APPARATUS APPLYING THE SAME

PRIORITY

This application claims priority under 35 U.S.C. § 119(a) to Korean Patent Application Nos. 2009-78239 and 2009-78263, filed on Aug. 24, 2009, in the Korean Intellectual Property Office, the disclosures of which are incorporated herein by reference.

BACKGROUND OF THE INVENTION

1. Field of the Invention

The present invention relates generally to a method for transmitting an image and an image pickup apparatus using the same, and more particularly, to a method for transmitting an image photographed by an image pickup apparatus and an image pickup apparatus using the same.

2. Description of the Related Art

Recently, a digital camera that stores digital photographs is widely distributed. The digital camera is very convenient since a user can check photos right after taking them and also store the photo data in the form of a computer file. Because of such convenience, digital cameras are very popular.

In addition, a user may share photos taken by the digital camera with many others by copying the photo files and transmitting them through e-mail. However, in order to send the photo files in the digital camera to others, a user must connect the digital camera to a computer, copy the photo files, and send them through e-mail or send a CD in which the photo files are recorded. Accordingly, a user may experience inconvenience of going through such complicated processes to send photos taken by the digital camera to others.

In addition, in order to receive photo files photographed by the digital camera from others, a user must connect the digital camera to a computer of the other people and copy the photo files from the computer. As such, the user may experience inconvenience of going through such complicated processes to receive photos taken by another's digital camera.

Furthermore, if a user wishes to find a photo where he or she appears, the user must check every stored photo one by one. As such, in order to find a photo where he or she appears, the user may experience inconvenience of identifying the list of stored photos, selecting a desired photo, and downloading or copying the selected photo.

A user wishes to find desired contents more easily. Therefore, a method for transmitting/receiving desired contents from others more easily using an image pickup apparatus is required.

SUMMARY OF THE INVENTION

An aspect of the present invention provides a method for transmitting an image in which at least one face is recognized and selected from a photographed image and the photographed image is transmitted to a destination corresponding to the selected face. An image pickup apparatus using the same is also provided.

Another aspect of the present invention a method for transmitting contents in which user information is received from an external apparatus, contents corresponding to the received user information is searched, and the searched contents are transmitted to the external apparatus. An image pickup apparatus using the same is also provided.

In accordance with an aspect of the present invention, an image transmitting method includes recognizing a face included in an image and determining contents to be transmitted or a transmission destination using a recognized face and transmitting contents.

The image transmitting method further includes displaying the photographed image on a screen, and if touch manipulation is sensed in an area where the face is displayed on the screen, a face in an area where the touch is sensed may be selected.

The image transmitting method further includes searching information regarding a person corresponding to the selected face and determining the destination based on the information regarding the corresponding person.

The image transmitting method further includes storing the photographed image, and the recognizing includes recognizing at least one face from a stored image through the photographing.

The image transmitting method further includes displaying an image photographed by an image pickup element while in a stand-by mode on a screen, and the recognizing includes recognizing at least one face from an image photographed by the image pickup element while in the stand-by mode.

The image transmitting method further includes transmitting a list of contents corresponding to the user information and receiving contents selection information from the external apparatus, and transmitting the contents includes transmitting contents selected based on the received contents selection information from among contents included in the list to the external apparatus.

In accordance with another aspect of the present invention, a photographing apparatus includes an image pickup element which photographs an image, an image processing unit which recognizes at least one face from the photographed image, a communication unit which is communicably connected to an external apparatus, and a controller which determines contents to be transmitted or a transmission destination using a recognized face.

The photographing apparatus further includes a manipulation unit which senses touch manipulation by a user and a display unit which displays the photographed image on a screen, and if touch manipulation is sensed in an area where one of the at least one face is displayed on the screen, the controller selects a face in an area where the touch is sensed.

The photographing apparatus further includes a storage unit that stores the photographed image, and the image processing unit recognizes at least one face from a stored image through the photographing.

The photographing apparatus further includes a display unit that displays an image photographed by an image pickup element while in a stand-by mode on a screen, and the image processing unit recognizes at least one face from an image photographed by the image pickup element while in the stand-by mode.

BRIEF DESCRIPTION OF THE DRAWINGS

The above and other aspects, features and advantages of the present invention will be more apparent from the following detailed description when taken in conjunction with the accompanying drawings, in which:

FIG. 2 is a flowchart illustrating a method for sharing photos of an image pickup apparatus according to an embodiment of the present invention;

DETAILED DESCRIPTION OF EMBODIMENTS OF THE INVENTION

Figure 1:
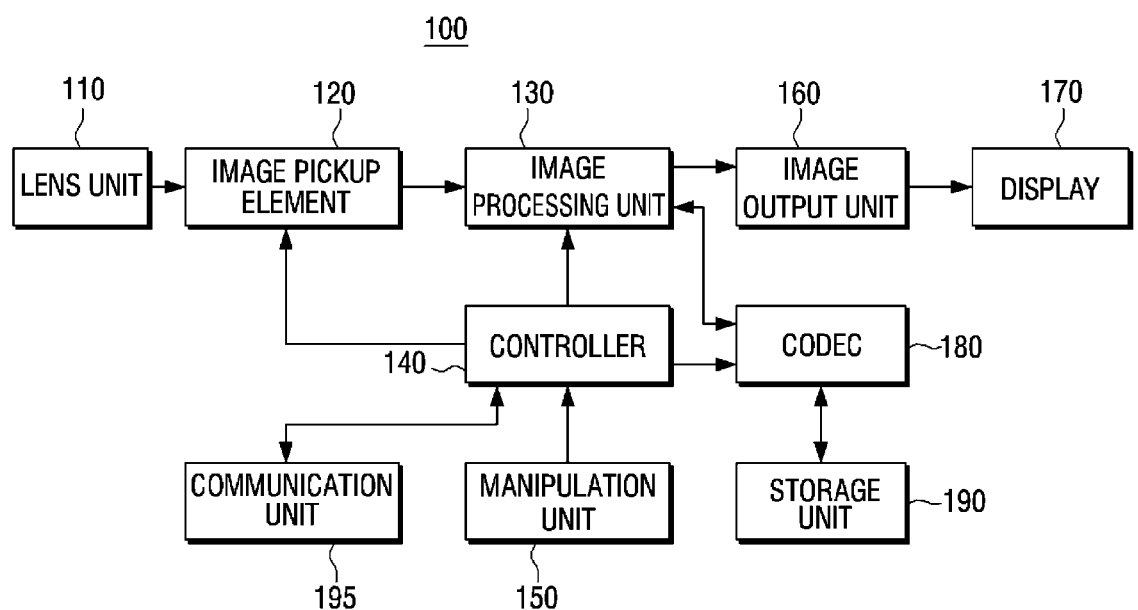
FIG. 1 is a block diagram illustrating a configuration of an image pickup apparatus in detail according to an embodiment of the present invention.

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

FIG. 1 is a block diagram illustrating a configuration of an image pickup apparatus 100 in detail according to an embodiment of the present invention. As illustrated in FIG. 1, the image pickup apparatus 100 comprises a lens unit 110, an image pickup element 120, an image processing unit 130, a controller 140, an input or manipulation unit 150, an image output unit 160, a display 170, a codec 180, a storage unit 190, and a communication unit 195.

The lens unit 110 collects light of a subject and forms an optical image on an image pickup area.

The image pickup element 120 photographs an incident image input through the lens unit 110. Specifically, the image pickup element 120 performs photoelectrical transformation on incident light input through a lens to transform the light into an electric signal and performs a predetermined signal processing on the electric signal. The image pickup element 120 comprises a pixel and an AD converter. Each pixel outputs an analog image signal, and the AD converter transforms the analog image signal into a digital image signal and outputs the transformed signal.

The image processing unit 130 performs signal processing on an image input from the image pickup element 120, and transmits the signal-processed image signal to the image output unit 160 to display the photographed image. In addition, the image processing unit 130 outputs the signal-processed image signal to the codec 180 to store the photographed image.

Specifically, the image processing unit 130 performs digital zoom, auto white balance (AWB), auto focus (AF), and auto exposure (AE) on an image signal output from the image pickup element 120.

In addition, the image processing unit 130 performs a function of recognizing a face from a photographed image. Specifically, the image processing unit 130 performs a process of detecting a face from a photographed image and recognizing characteristics of the face. The process of detecting a face refers to a process of detecting an area in which a face is included from a photographed image. The process of recognizing characteristics of the face refers to a process of recognizing distinctive features of the face that distinguishes the face from other faces.

The face detecting process includes color-based face detection, edge-based eye detection, face standardization, and support vector machine (SVM)-based face detection.

The color-based face detection is a process of detecting a face from an input image using information on skin color of the face. Specifically, the color-based face detection generates a skin color filter using YCbCr information of an input image and extracts a face area. That is, the color-based face detection is a process of extracting only the portion having a skin color from an input image.

The edge-based eye detection is a process of detecting an eye area using light and darkness information. An eye area can be easily detected in most cases, but various hairstyles or glasses may make it difficult to detect an eye area.

Subsequently, a face area is standardized using a detected eye area, and the standardized face area is verified using an SVM, which reduces the possibility of wrongly detecting a face area to less than 1%.

By going through the above process, the image processing unit 130 detects a face from a photographed image.

Meanwhile, there are a holistic approach and an analytic approach in recognizing characteristics of a face.

The holistic approach refers to a method of recognizing a face based on overall characteristics of a face pattern, and the method includes an Eigenface method, and a template matching-based method.

The analytic approach is a method of recognizing a face by extracting geometric characteristics of a face. The analytic approach is advantageous in that it can recognize a face fast and requires a relative small amount of memory. However, it is difficult to select and extract characteristics of a face.

The distinctive feature of a face is recognized in the following steps. The image processing unit 130 receives an image including a face. The image processing unit 130 extracts components constituting a face (for example, eye, nose, and mouth). In the case where the face is rotated, the image processing unit 130 adjusts the face considering light on the face. By going through the above processes, the image processing unit 130 extracts the characteristics of the face and detects a human face from the photographed image.

In other words, the image processing unit 130 extracts an overall pattern of a face from a photographed image and recognizes the characteristics of the face in the photographed image using the detected face pattern.

The image output unit outputs an image signal received from the image processing unit to an internal display 170 or an external output terminal.

The display 170 displays a photographed image on a screen.

The codec 180 encodes an image signal received from the image processing unit 130. In addition, the codec 180 transmits the encoded image signal to the storage unit 190. The codec 180 also decodes encoded image signals stored in the storage unit 190. The codec 180 transmits the decoded image signals to the image processing unit 130.

That is, the codec 180 performs encoding when a photographed image is stored, and performs decoding when a stored image is output to the image processing unit 130.

The storage unit 190 stores an image photographed in the image pickup element 120 in a compressed form. The storage unit 190 also stores an address book. In this case, the address book represents a database in which a user records contact numbers of people. The address book contains information regarding people and includes at least one of name, address, e-mail address, and phone number. In addition, the address book stores a photo of each person. The storage unit 190 may be realized using a flash memory, a hard disk, or a DVD.

The manipulation unit receives a command through a user's manipulation. The manipulation unit 150 may be formed on the surface of the image pickup apparatus in the form of a button, or may be formed on the display 170 in the form of touch screen.

The manipulation unit 150 receives a command from a user for selecting a desired face from among a plurality of faces included in a photograph.

The communication unit 195 is communicably connected to an external apparatus through various networks such as Internet. The communication unit 195 may be connected to an external apparatus using a wired network such as a wired LAN or wireless network such as a wireless LAN or using Bluetooth®.

In addition, the communication unit 195 may transmit a photographed image to an apparatus of a specific user.

The controller 140 controls the overall operation of the image pickup apparatus 100. Specifically, the controller 140 controls the image processing unit 130 to perform signal processing on a photographed image. In addition, the controller 140 controls the codec 180 to encode or decode an image signal.

The controller 140 selects at least one face from among faces recognized by the image processing unit 130. In addition, the controller 140 controls the communication unit 195 to transmit a photographed image to a destination corresponding to the selected face. Herein, the destination corresponding to the selected face may be an e-mail address or a telephone number. If the destination is an e-mail address, the communication unit 195 transmits the photographed image through the e-mail. Alternatively, if the destination is a telephone number, the communication unit 195 transmits the photographed image through a multimedia message service (MMS). Any apparatus that can transmit a photographed image may be used as a means to transmit the photographed image.

In addition, if at least one face from among faces displayed on a screen is sensed through touch manipulation, the controller 140 selects the face sensed through touch.

Subsequently, the controller 140 searches information on the person corresponding to the selected face and determines a destination based on the searched information regarding the person. Herein, the information on the person refers to information on the person recorded in the address book. Specifically, the information on the person includes at least one of name, address, e-mail address, telephone number and photo of the person.

The controller 140 searches a portrait photo corresponding to characteristics of an extracted face, and extracts information regarding the person corresponding to the searched portrait photo.

Herein, the portrait photo and the information on the person may be recorded in the address book stored in an internal storage medium, such as storage unit 190. Alternatively, the portrait photo and the information on the person may be recorded in an address book stored in an external storage medium. In this case, the controller 140 searches a portrait photo corresponding to the characteristics of an extracted face from the external storage medium and extracts information on the person corresponding to the searched portrait photo from an address book stored in the external storage medium. In this case, the controller 140 communicates with the external storage medium through the communication unit 195.

In addition, the controller 140 controls the communication unit 195 to transmit a photographed image to an e-mail address corresponding to a selected face.

As such, the image pickup apparatus 100 may transmit a photographed image to an e-mail address of a person included in the photographed image. Accordingly, a user selects a face of a person from a photographed image after taking the photo, and transmits the photo to the e-mail address of the person.

FIG. 2 is a flowchart illustrating a method for sharing photos of the image pickup apparatus 100 according to an embodiment of the present invention.

Firstly, the image pickup apparatus 100 photographs an image by a user's manipulation in step S210. Subsequently, the image pickup apparatus 100 checks whether the photographed image is set to be shared with other people in step S220. If the photographed image is not set to be shared with others, the image pickup apparatus 100 stores the photographed image in the storage unit 190 in step S225.

Alternatively, if the photographed image is set to be shared with others in step S220, the image pickup apparatus 100 selects a face from the photographed image according to the user's manipulation in step S230. Subsequently, the image pickup apparatus 100 automatically designates a face area with respect to a point selected by the user in step S240. That is, the image pickup apparatus 100 designates a face area by selecting a face area including the point selected by the user from among the faces included in the photographed image. In this case, the image pickup apparatus 100 detects a face of a person from the photographed image using the afore-mentioned face recognition technology.

Subsequently, the image pickup apparatus 100 extracts data regarding characteristics of the face recognition area. As such, the image pickup apparatus 100 recognizes faces of people in a photographed image by detecting a face and extracting characteristics of the detected face from a photographed image.

Subsequently, the image pickup apparatus 100 compares data regarding characteristics of a face of a person in an address book stored in the storage unit 190 with data regarding characteristics of the face of the detected person in the photographed image in step S250.

If it is determined that there is no data regarding characteristics of the face of a person corresponding to characteristics of the face of the detected person in the photographed image in the address book in step S260, the image pickup apparatus 100 confirms whether to register information regarding the detected person from a user in step S265. If the user decides not to register the person in step S265, the process is terminated.

Alternatively, if the user decides to register information regarding the detected person in step S265, the image pickup apparatus 100 stores information regarding the newly registered person and compares data regarding characteristics of a face of a person in an updated address book with data regarding characteristics of the face of the detected person in the photographed image again in step S250.

In step S260, if it is determined that there is data regarding characteristics of the face of a person corresponding to characteristics of the face of the detected person in the photographed image in the address book, the image pickup apparatus 100 displays a message for confirming the figure on the screen and receives a confirmation command from a user in step S270.

Subsequently, the image pickup apparatus 100 updates the address book database by including the photo of the detected person in the address book in step S280. As such, by adding the photo of the person detected from the photographed image to the address book, the image pickup apparatus 100 may secure more data regarding face characteristics of people.

The image pickup apparatus 100 transmits the photographed image to an e-mail address of the detected person with reference to the address book in step S290. The image pickup apparatus 100 may transmit the photographed image to an apparatus of the detected person using other ways, such as MMS.

Through the above processes, the image pickup apparatus 100 may transmit the photographed image to the e-mail address of the person included in the photographed image. Accordingly, the user may select a face of a person included in a photographed image after taking the photo, and transmit the photographed image to the e-mail address of the selected person.

Figure 3A:
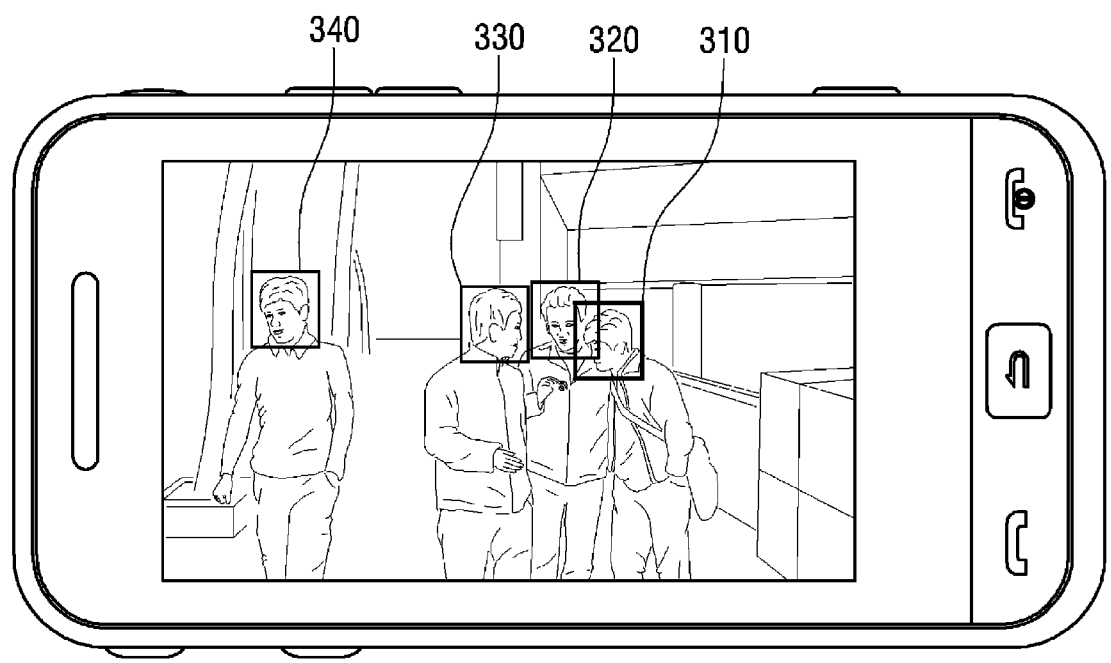
FIG. 3A illustrates a photo photographed by an image pickup apparatus according to an embodiment of the present invention.

Hereinafter, a process of selecting and confirming a person from a photographed image will be explained with reference to FIGS. 3A to 3B. FIG. 3A illustrates a photo photographed by the image pickup apparatus 100 according to an embodiment of the present invention.

A total of 4 people are included in the photographed image in FIG. 3A. As the image pickup apparatus 100 recognizes a first face 310, a second face 320, a third face 330, and a fourth face 340, the faces are marked with a box. If a user selects the first face 310, a confirmation message in FIG. 3B is displayed.

Figure 3B:
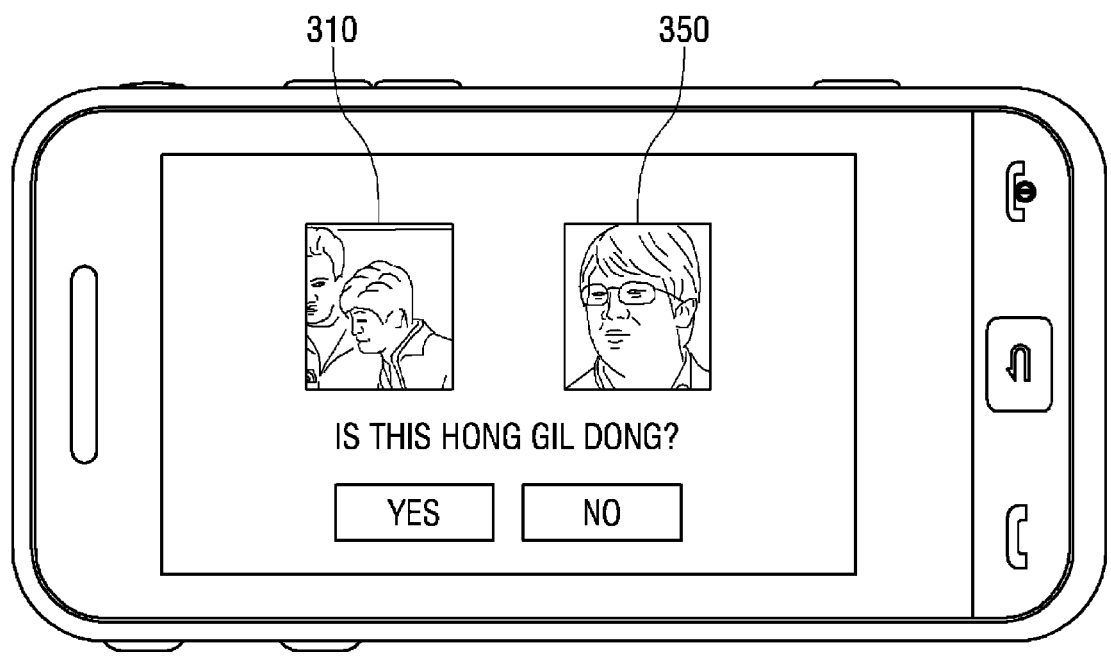
FIG. 3B illustrates a message for confirming a figure in an image pickup apparatus according to an embodiment of the present invention.

FIG. 3B illustrates a screen in which a message for confirming a figure is displayed in the image pickup apparatus 100 according to an embodiment of the present invention. As illustrated in FIG. 3B, a message for confirming a figure is displayed along with the photo of the selected first face 310 and the photo 350 extracted from an address book. The photo 350 extracted from an address book is a photo that the image pickup apparatus 100 determines to correspond to the person of the first face 310.

The message for confirming a figure from a user is displayed regarding whether a figure selected from a photographed image is the same as a corresponding figure in an address book after the figure selected from the photographed image and the corresponding figure in the address are displayed together.

If a user selects 'yes' while the message for confirming a figure is displayed, the image pickup apparatus 100 transmits the photographed image to an e-mail address of the corresponding person with reference to the address book.

Hereinafter, a process of transmitting a photographed image to people included in the photographed image is discussed with reference to FIGS. 4A to 4H. FIGS. 4A to 4H illustrate a process of transmitting a photo to those who appear on the photo according to an embodiment of the present invention.

Figure 4A:
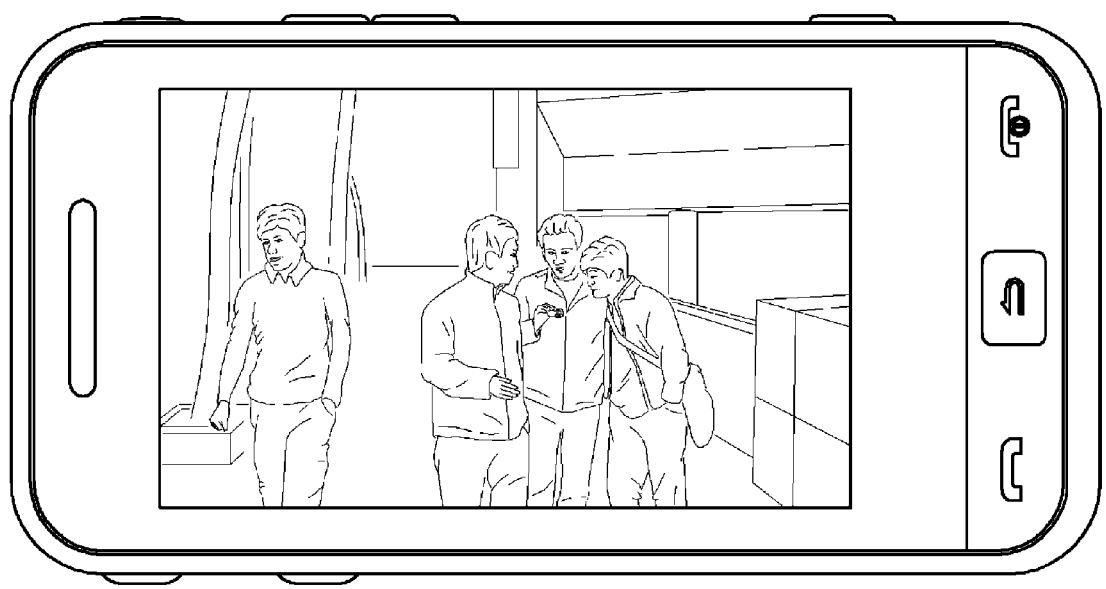
FIGS. 4A to 4H illustrate a process of transmitting a photo to those who appear in the photo according to an embodiment of the present invention.

FIG. 4A illustrates a view in which a photographed image is displayed. As illustrated in FIG. 4A, once a user photographs an image, the image pickup apparatus 100 displays the photographed image on the screen.

Figure 4B:
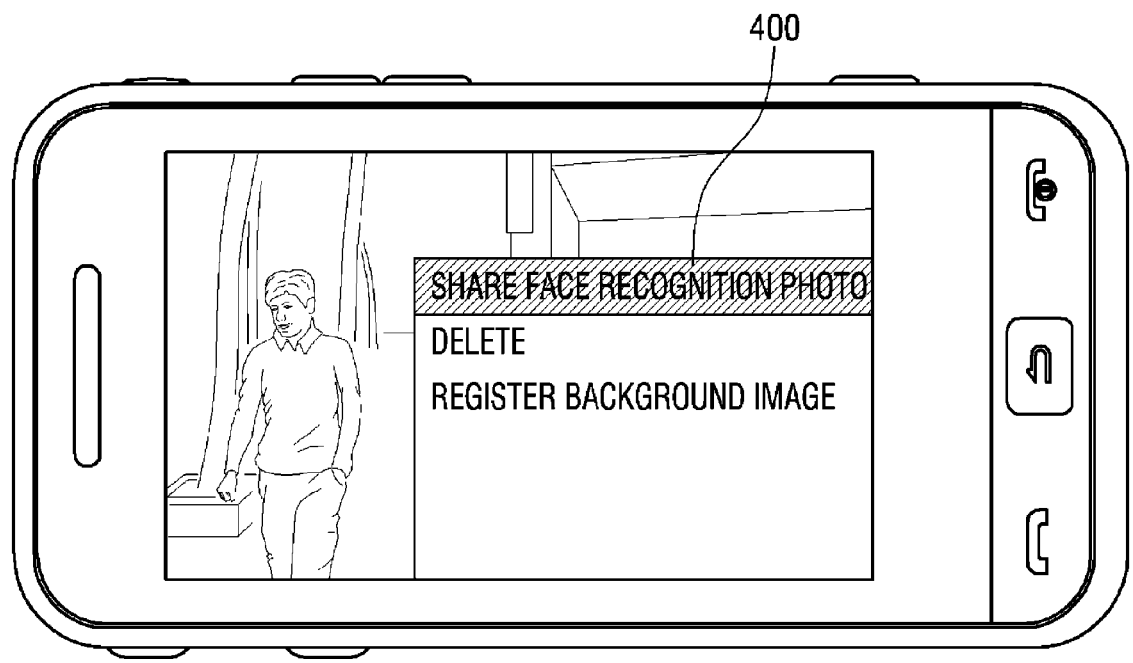

As illustrated in FIG. 4B, the image pickup apparatus 100 displays a user menu 400 on the screen according to a user's manipulation. If 'share face recognition photo' is selected from the user menu, the image pickup apparatus 100 initiates a face selection mode. Herein, the face selection mode refers to a mode in which a user selects a face from a photographed image. In this case, the image pickup apparatus 100 recognizes the area where a face is included using the face recognition function. Accordingly, if the user touches the area where a face is included, the image pickup apparatus 100 selects the touched face and marks the face with a box.

Figure 4C:
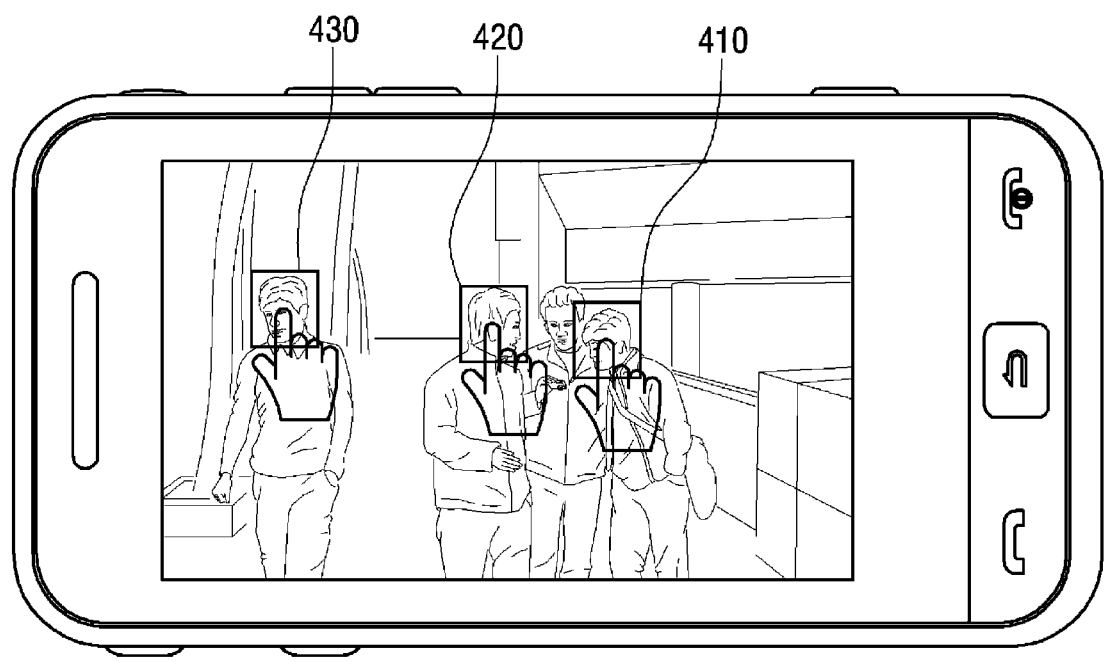

FIG. 4C illustrates that a user selecting a first face 410, a second face 420 and a third face 430 in a photographed image. As illustrated in FIG. 4C, if three faces are selected, the image pickup apparatus 100 goes through a process of confirming the selected three faces.

Figure 4D:
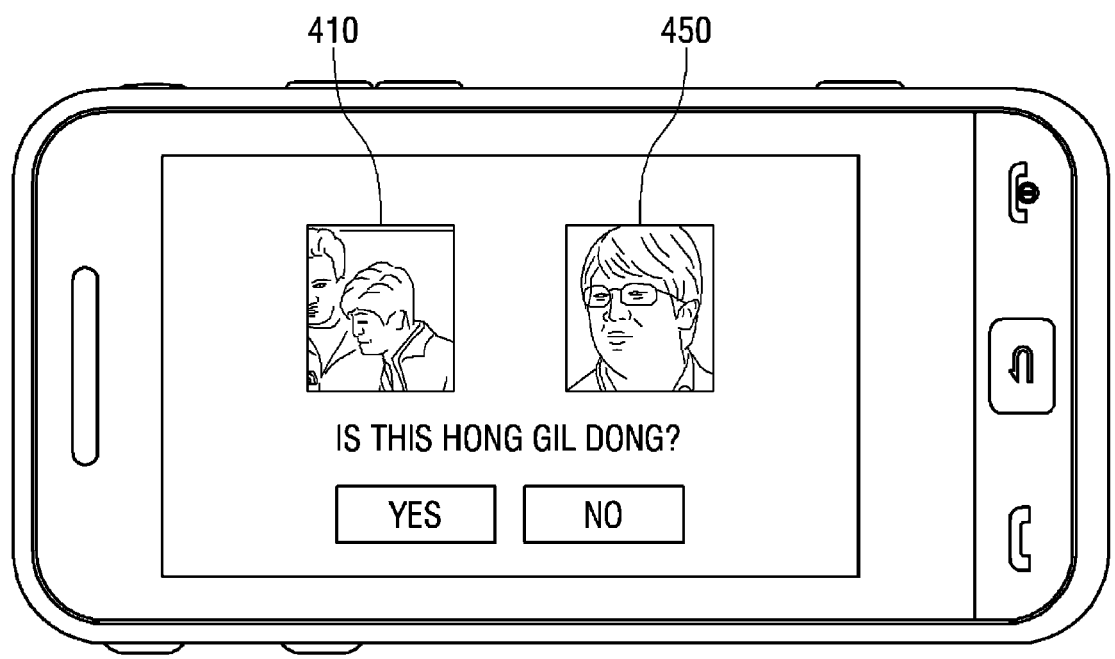

FIG. 4D is a view illustrating a screen where a message for confirming a figure to confirm the first face 410 is displayed in the image pickup apparatus 100.

As illustrated in FIG. 4D, a message for confirming a figure is displayed along with the photo of the selected first face 410 and the photo extracted from an address book 450. The photo extracted from the address book 450 is a photo that the image pickup apparatus 100 determines to correspond to the person with the first face 410.

If a user selects 'yes' while the message for confirming a figure is displayed, the image pickup apparatus 100 goes through a process of confirming the second face 420.

Figure 4E:
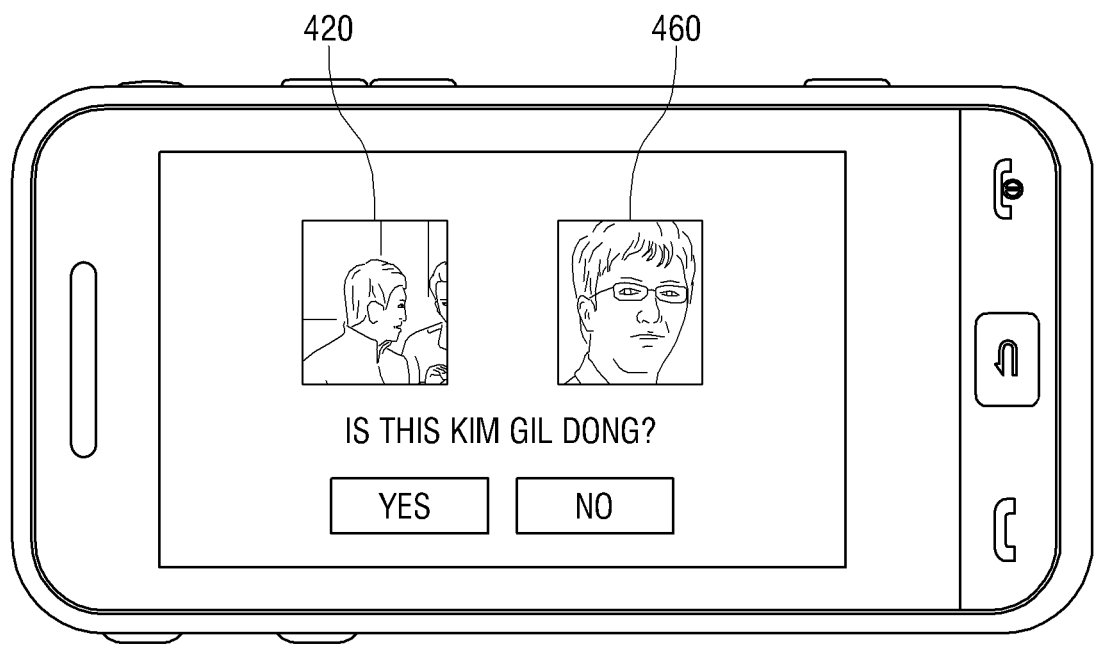

FIG. 4E illustrates a screen where a message for confirming a figure to confirm the second face 420 is displayed on the image pickup apparatus 100.

As illustrated in FIG. 4E, a message for confirming a figure is displayed along with the photo of the selected second face 420 and the photo extracted from an address book 460. The photo extracted from the address book 460 is a photo that the image pickup apparatus 100 determines to correspond to the person with the second face 420.

If a user selects 'yes' while the message for confirming a figure is displayed, the image pickup apparatus 100 goes through a process of confirming the third face 430.

Figure 4F:
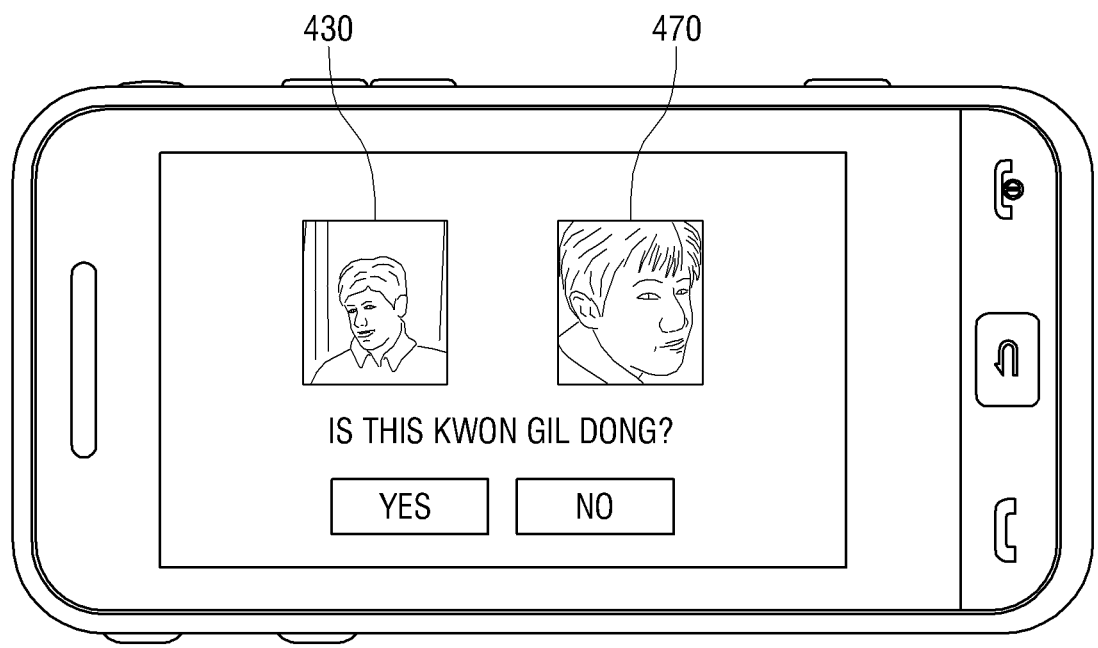

FIG. 4F illustrates a screen where a message for confirming a figure to confirm the third face 430 is displayed on the image pickup apparatus 100.

As illustrated in FIG. 4F, a message for confirming a figure is displayed along with the photo of the selected third face 430 and the photo extracted from an address book 470. The photo extracted from the address book 470 is a photo that the image pickup apparatus 100 determines to correspond to the person with the third face 430.

Figure 4G:
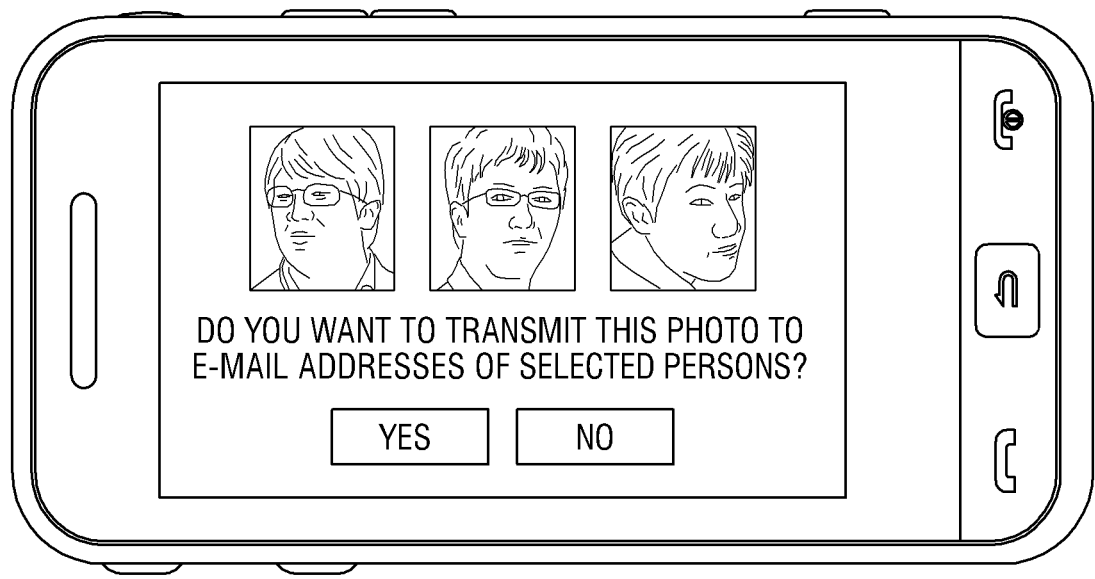

If a user selects 'yes' while the message for confirming a figure is displayed, a message for confirming whether to transmit a photo to e-mail addresses corresponding to the first face 410, the second face 420, and the third face 430 is displayed as illustrated in FIG. 4G.

Figure 4H:

Herein, if the user selects 'yes', the image pickup apparatus 100 extracts e-mail addresses corresponding to the first face 410, the second face 420, and the third face 430 from the address book. The image pickup apparatus 100 transmits the photographed image to the extracted e-mail addresses. Subsequently, the image pickup apparatus 100 displays a message for informing that the photographed image has been transmitted to the e-mail addresses on the screen as illustrated in FIG. 4H.

By going through the above processes, the image pickup apparatus 100 transmits a photographed image to e-mail addresses corresponding to people included in the photographed image. Accordingly, a user may transmit a photographed image to corresponding people simply by selecting the faces in the photographed image.

Hereinafter, a process of registering a portrait photo in an address book is discussed with reference to FIGS. 5A to 5H. FIGS. 5A to 5H illustrate a process of registering a portrait photo in an address book using face recognition technology according to an embodiment of the present invention.

Figure 5A:
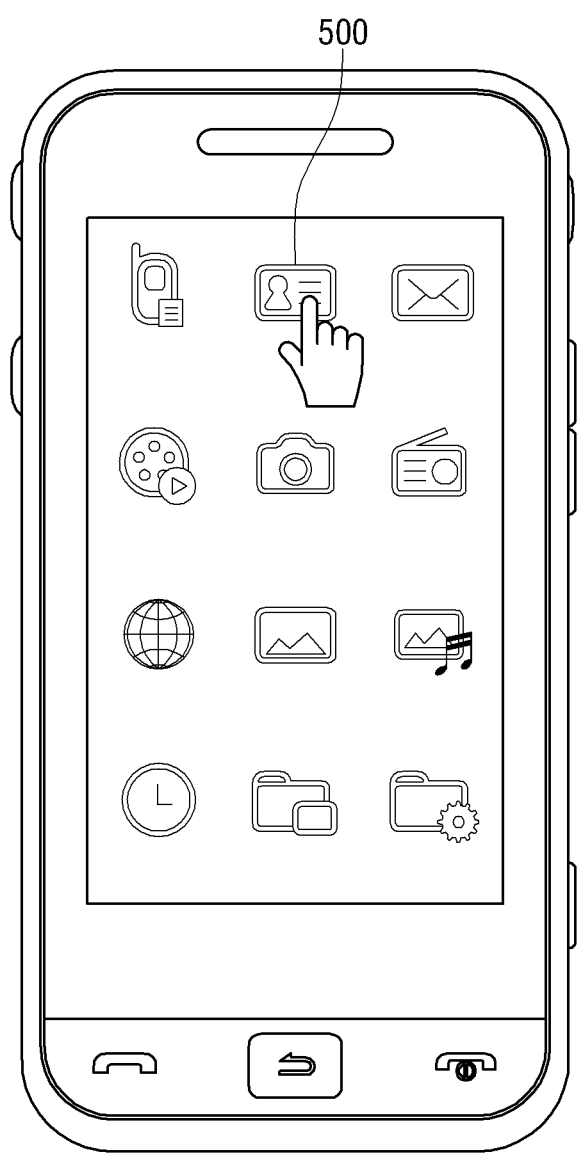
FIGS. 5A to 5H illustrate a process of registering a portrait photo in an address book using face recognition technology according to an embodiment of the present invention.

As illustrated in FIG. 5A, the image pickup apparatus displays a main menu on the screen. In this case, if a user touches an address book icon 500, the image pickup apparatus 100 receives a command to select the address book icon 500 and executes the address book.

Figure 5B:
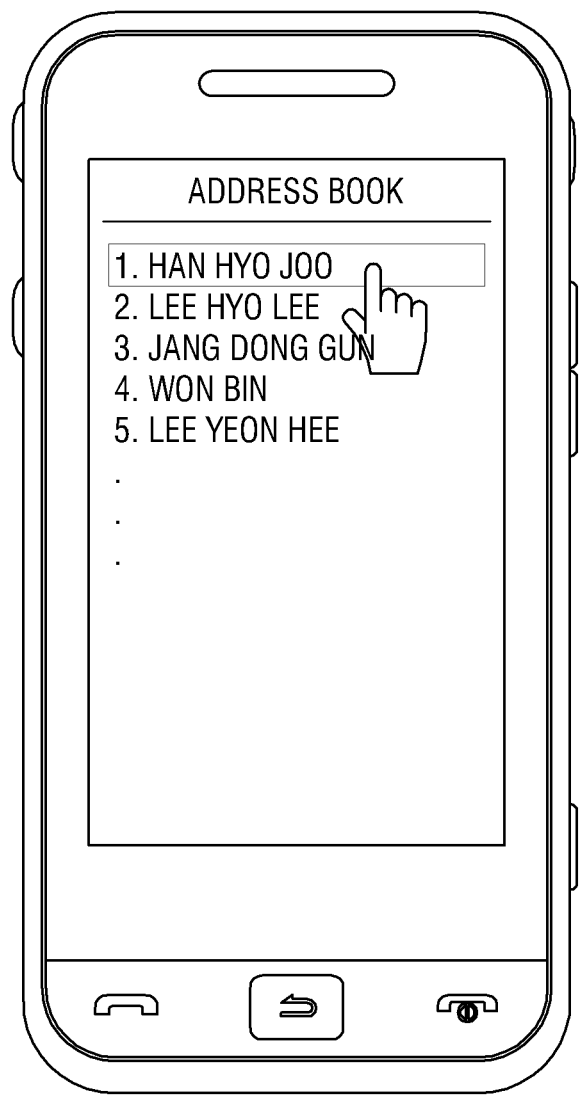

FIG. 5B illustrates a screen where an address book is executed. As illustrated in FIG. 5B, if a user selects "Han Hyo Joo" from the address book, the image pickup apparatus 100 receives a command to select "Han Hyo Joo" from the address book.

Figure 5C:
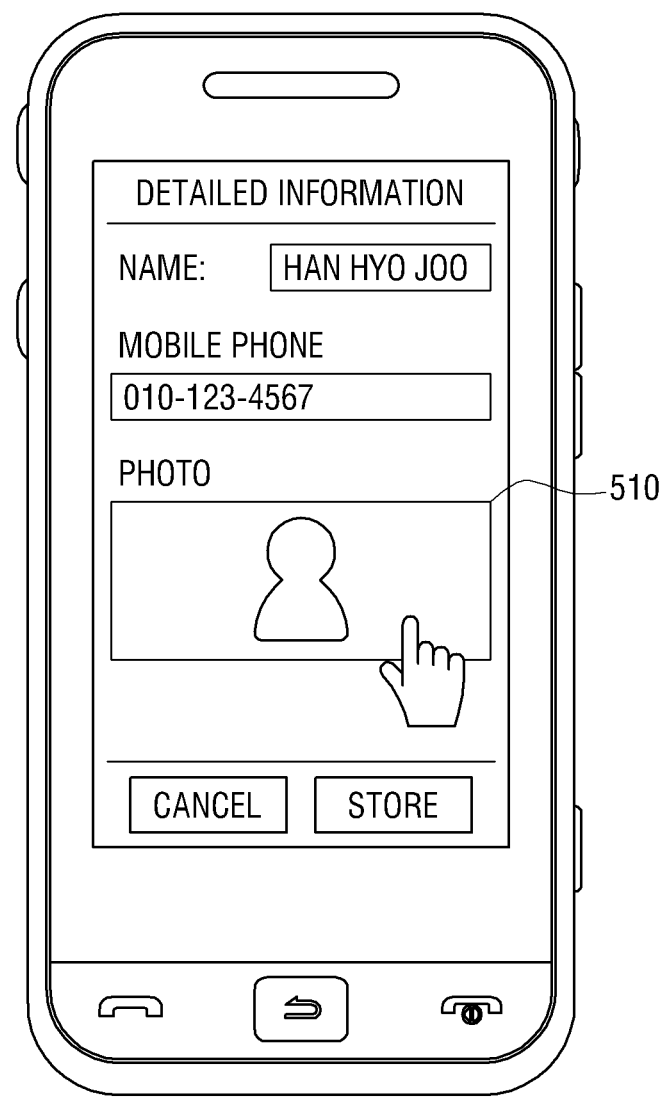

Accordingly, detailed information regarding "Han Hyo Joo" is displayed on the screen as illustrated in FIG. 5C. If the user selects a photo registration button 510, the image pickup apparatus 100 performs a photo registration process. Herein, the photo registration process refers to a process of registering a photo corresponding to a person selected from the address book.

Figure 5D:
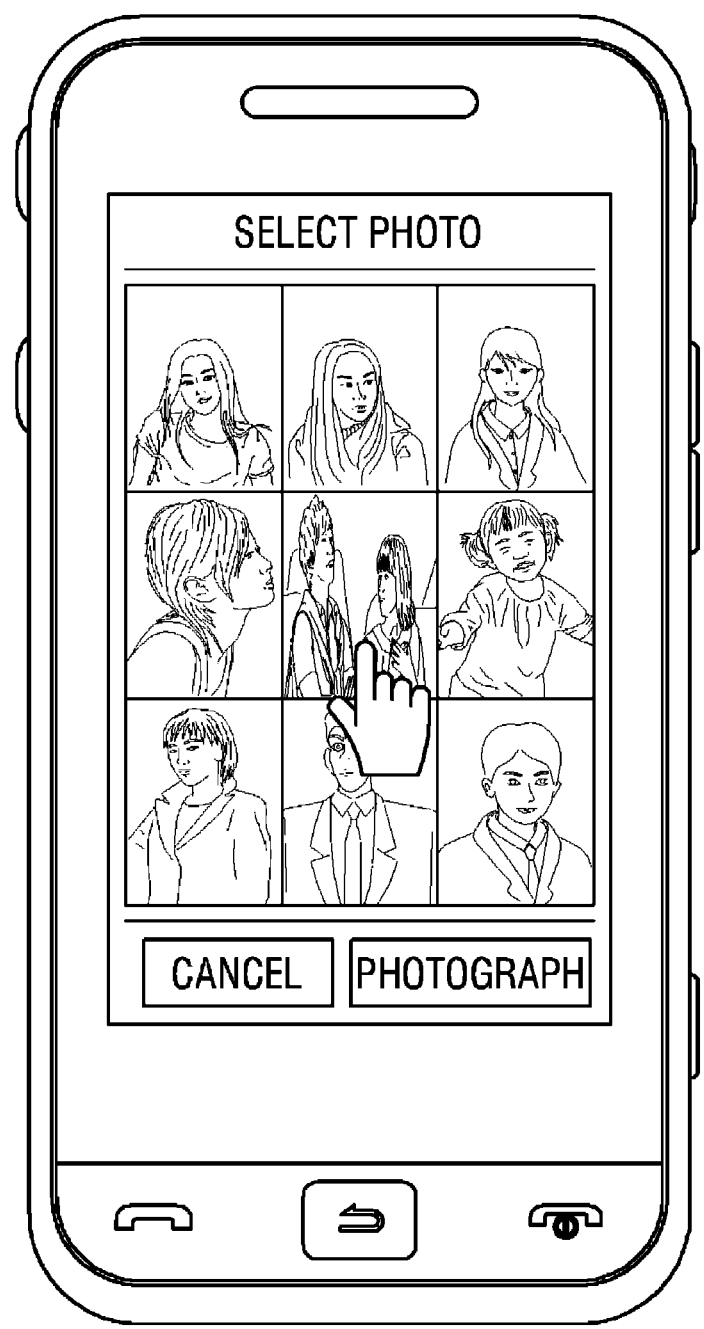

If the user selects the photo registration button 510, the image pickup apparatus 100 displays a photo list on the screen as illustrated in FIG. 5D. As illustrated in FIG. 5D, if the user touches a desired photo from the photo list, the image pickup apparatus 100 receives a command to select the touched photo. Accordingly, the image pickup apparatus 100 displays the selected photo on the full screen as illustrated in FIG. 5E.

Figure 5E:
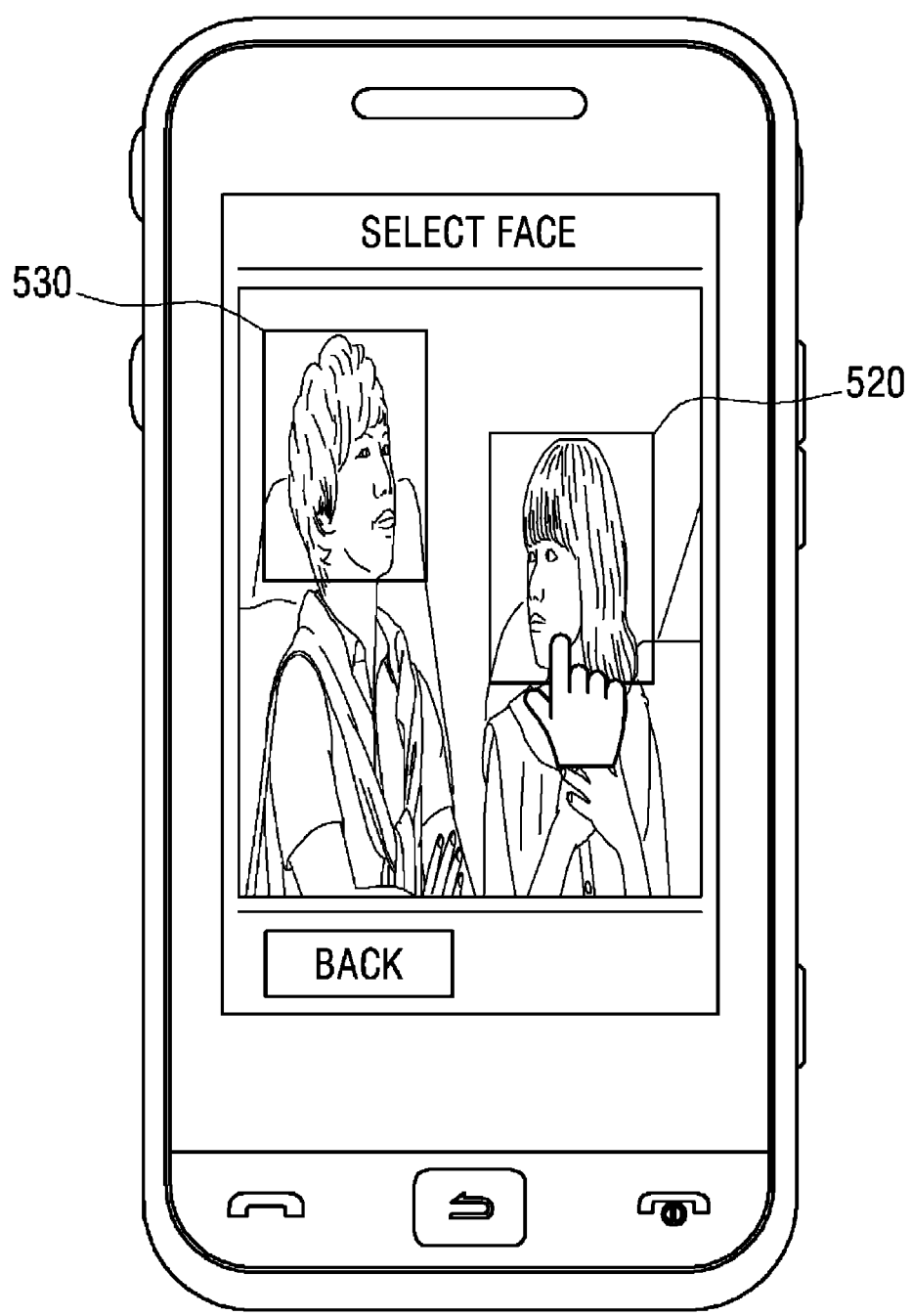

If a selected photo includes faces as illustrated in FIG. 5E, the image pickup apparatus 100 recognizes the faces included in the photo and displays an indicator around the faces. FIG. 5E includes a first face 520 and a second face 530, and the first face 520 and the second face 530 are marked with a box.

Figure 5F:
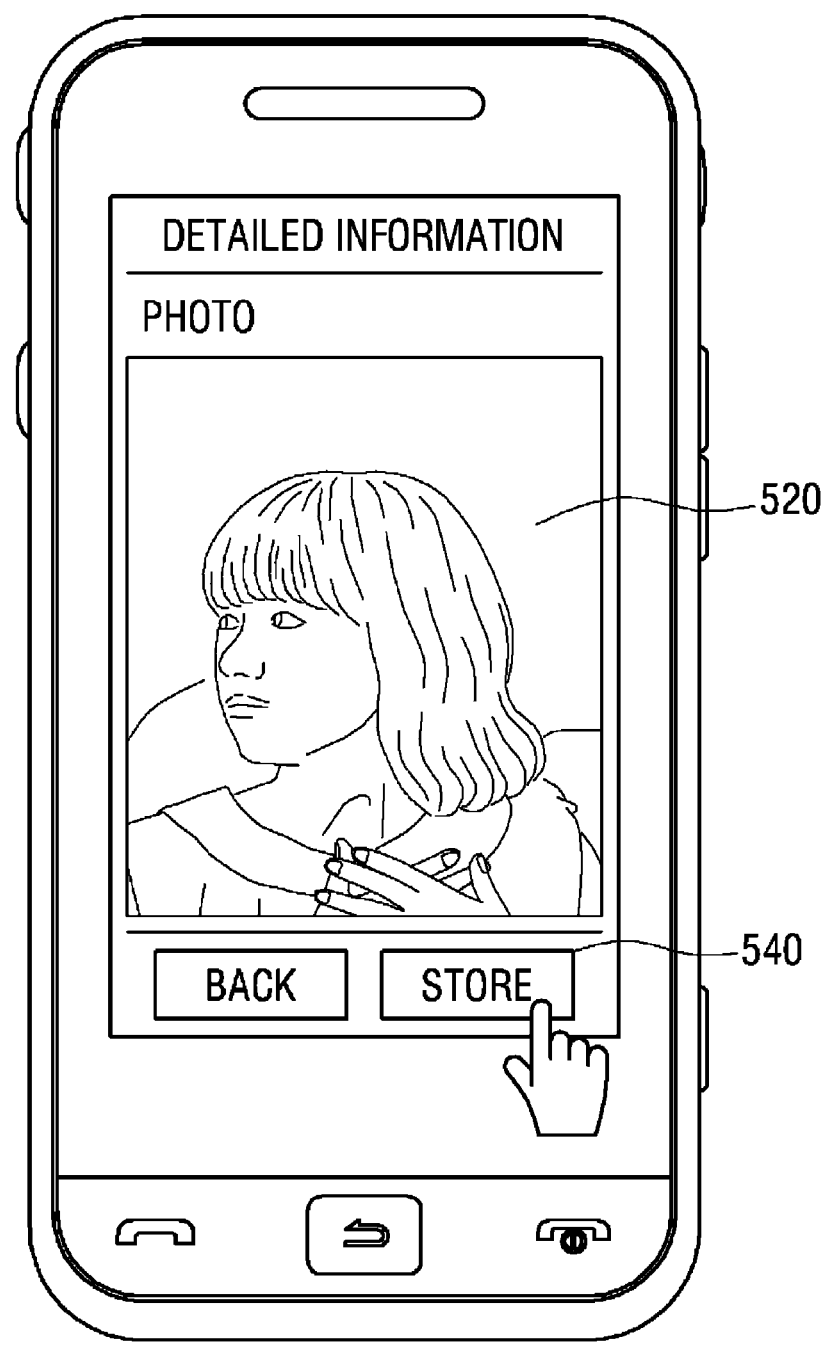

As illustrated in FIG. 5E, if a user touches the first face 520, the image pickup apparatus 100 receives a command to select the first face 520. Accordingly, the image pickup apparatus 100 displays the selected face on a separate screen as illustrated in FIG. 5F. In addition, a storage button 540 is displayed along with the photo of the first face 520 as illustrated in FIG. 5F. Herein, the storage button 540 receives a command to store the selected face photo by matching the selected face photo to a corresponding person selected from the current address book.

Figure 5G:
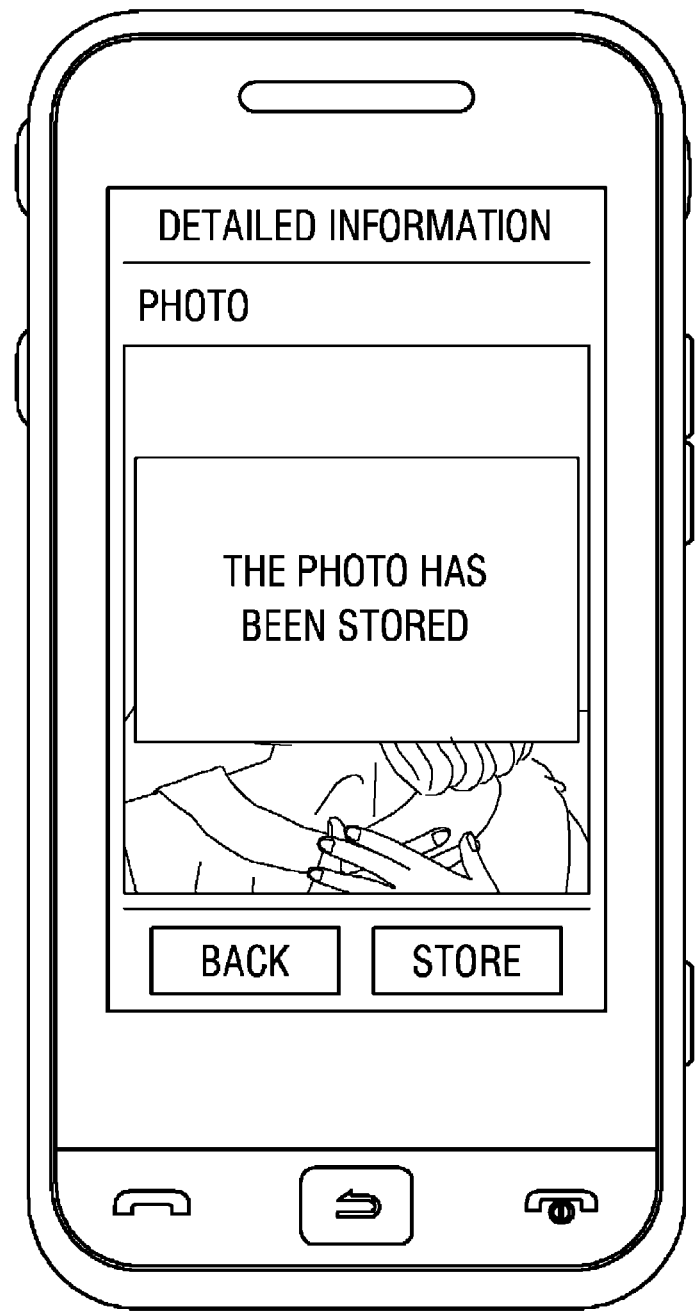
Figure 5H:
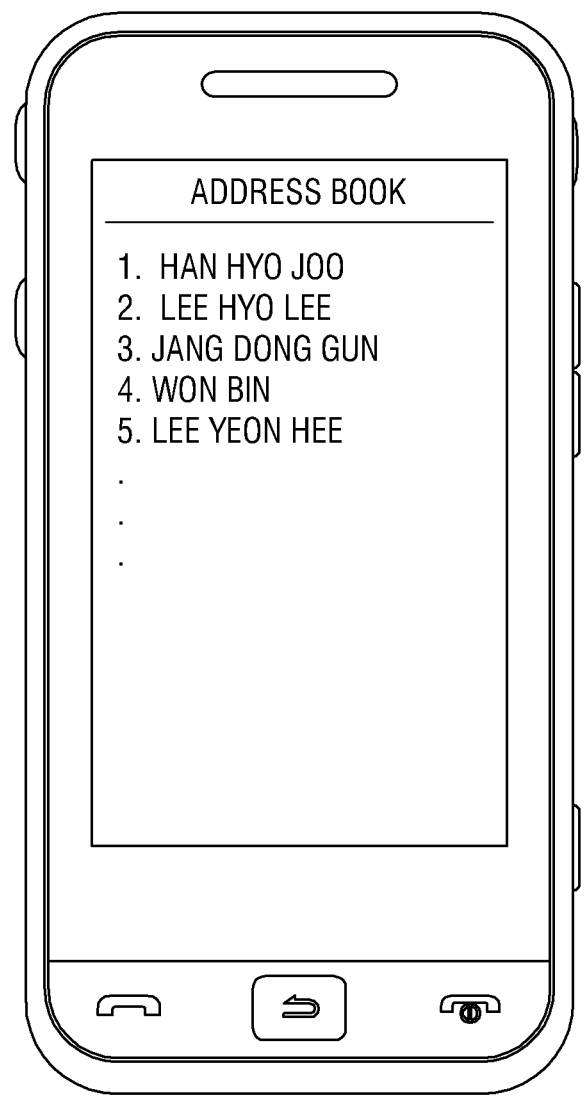

Accordingly, as illustrated in FIG. 5F, if a user touches the storage button 540, the image pickup apparatus 100 stores the first photo 520 by matching the photo to "Han Hyo Joo" in the address book. Subsequently, a message confirming storage is displayed on the screen as illustrated in FIG. 5G. After registration is completed, a screen of the address book reappears as illustrated in FIG. 5H.

By going through the above processes, the image pickup apparatus 100 may register a photo by matching the photo to a corresponding person in an address book using face recognition function.

FIGS. 6A to 6D illustrate a process of taking a photo and registering the photo in an address book according to an embodiment of the present invention.

Figure 6A:
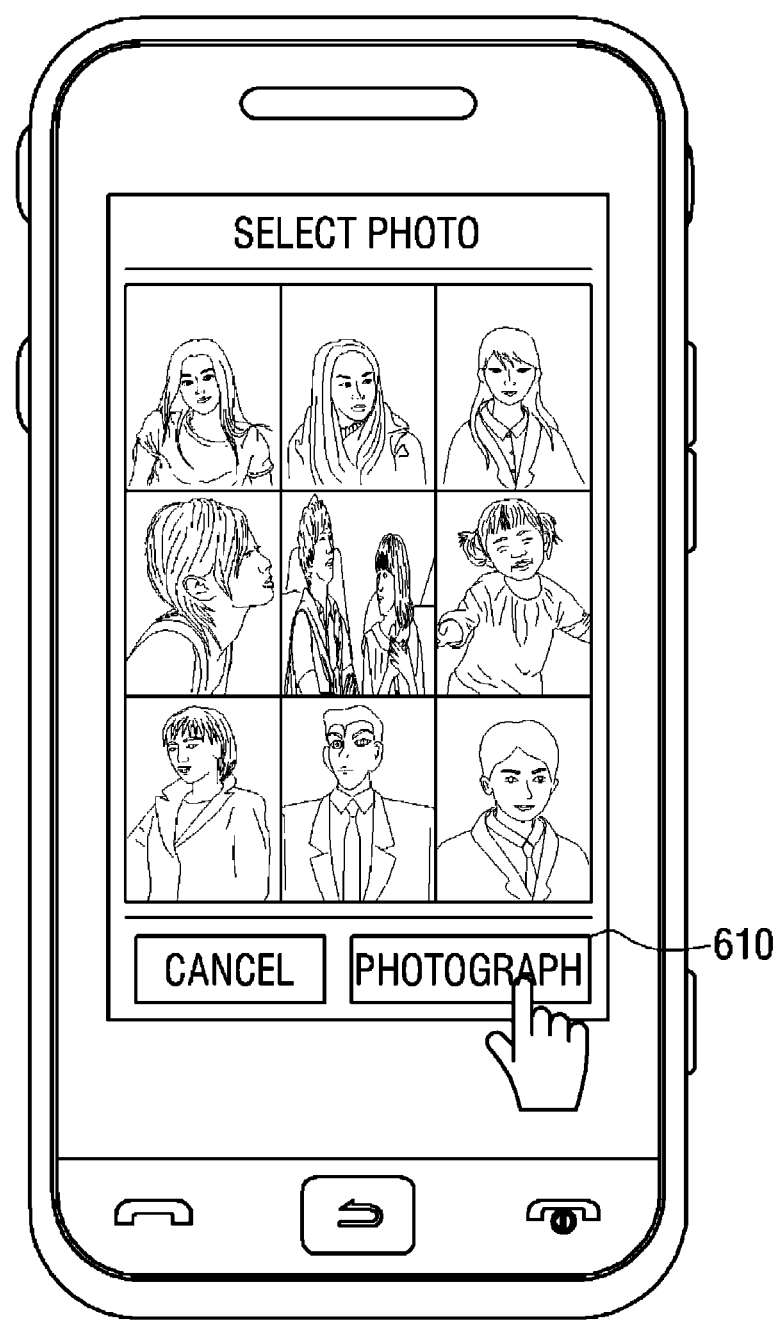
FIGS. 6A to 6D illustrate a process of taking a photo and registering the photo in an address book according to an embodiment of the present invention.
Figure 6B:
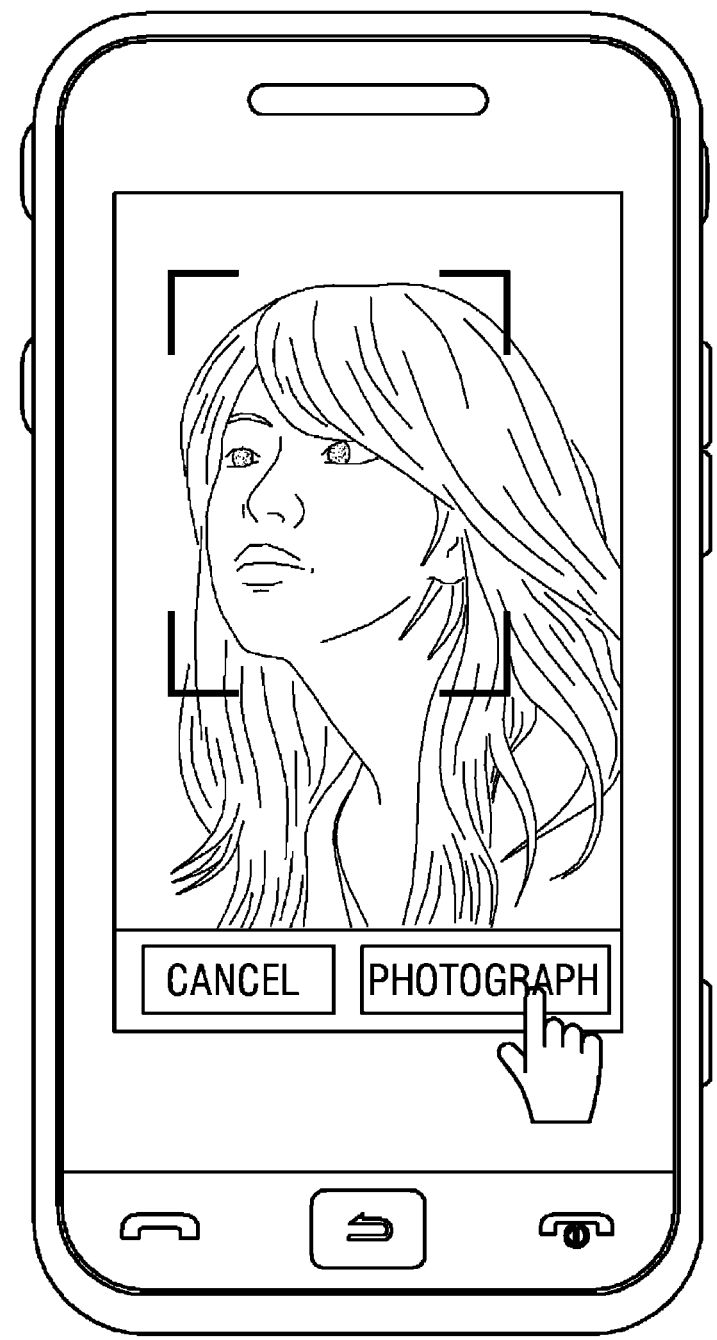

After the processes illustrated in FIGS. 5A to 5C, if a user touches a photographing button 610 as illustrated in FIG. 6A, the image pickup apparatus 100 executes a photographing mode. As illustrated in FIG. 6B, if the user photographs a face of a specific person, the image pickup apparatus displays the photographed image on the screen.

Figure 6C:
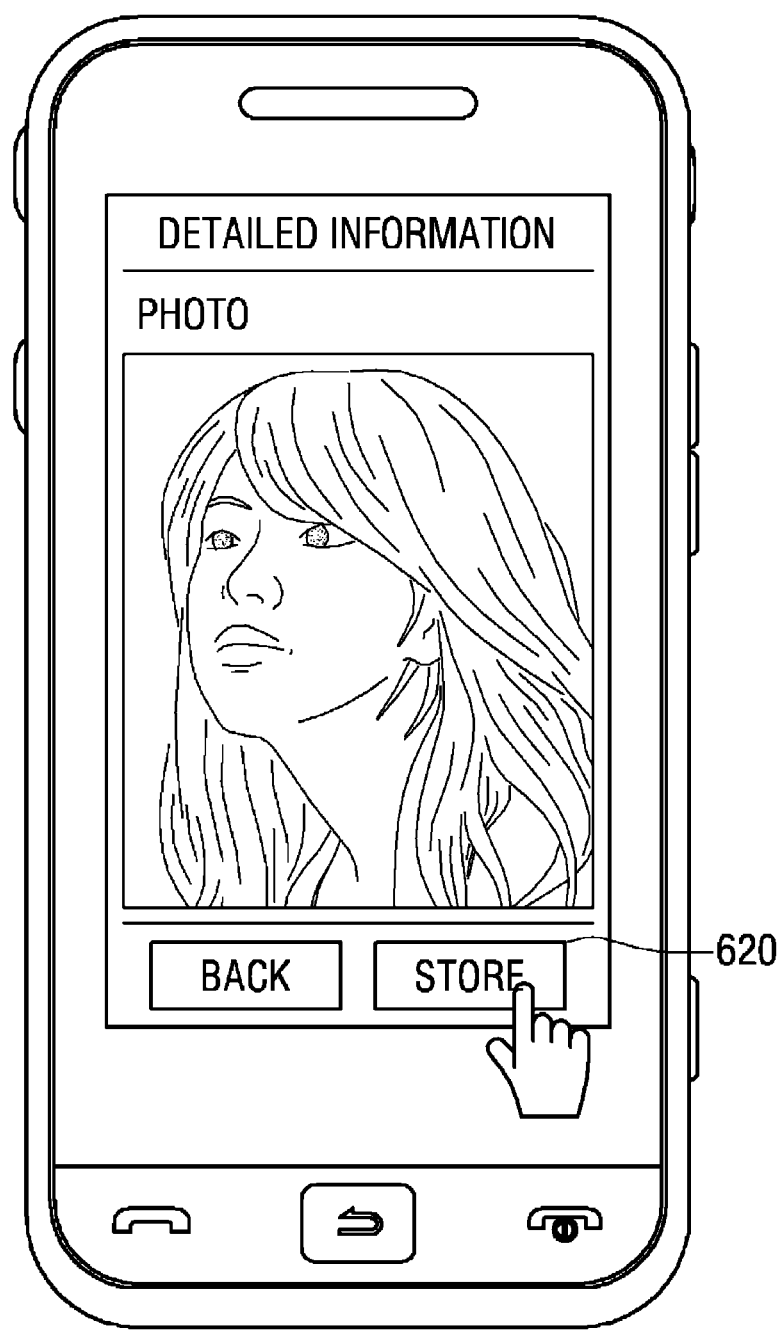
Figure 6D:
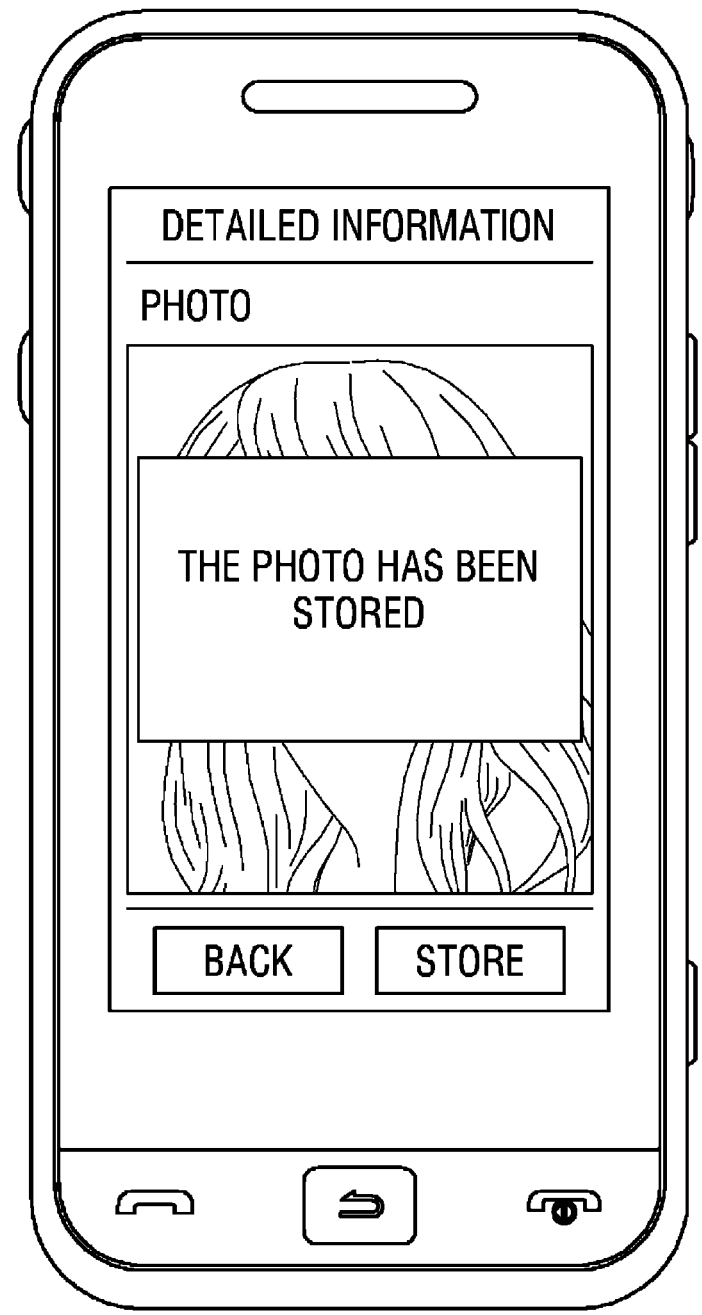

As illustrated in FIG. 6C, the image pickup apparatus 100 displays the photographed image on the screen and displays a message for confirming whether to store the photographed image by matching the image to a corresponding person in the address book. If the user touches the store button 620, the image pickup apparatus 100 stores the photographed image by matching the image to the corresponding person in the address book. That is, in FIG. 6C, the image pickup apparatus 100 stores the photographed image by matching the image to "Han Hyo Joo". If the image is stored, the image pickup apparatus 100 displays a message of informing that the image has been stored on the screen as illustrated in FIG. 6D.

As such, the image pickup apparatus 100 may not only select a photo from a photo list but also directly take a photo and register the photo by matching the photo to a corresponding person in an address book.

Hereinafter, a process of selecting one face from among faces included in a photo displayed on the screen and registering the selected photo in an address book will be explained with reference to FIGS. 7A to 7I. FIGS. 7A to 7E illustrate a process of registering a photo in an address book by matching a portion of a face in a photo on a screen with an existing figure in the address book according to an embodiment of the present invention.

Figure 7A:
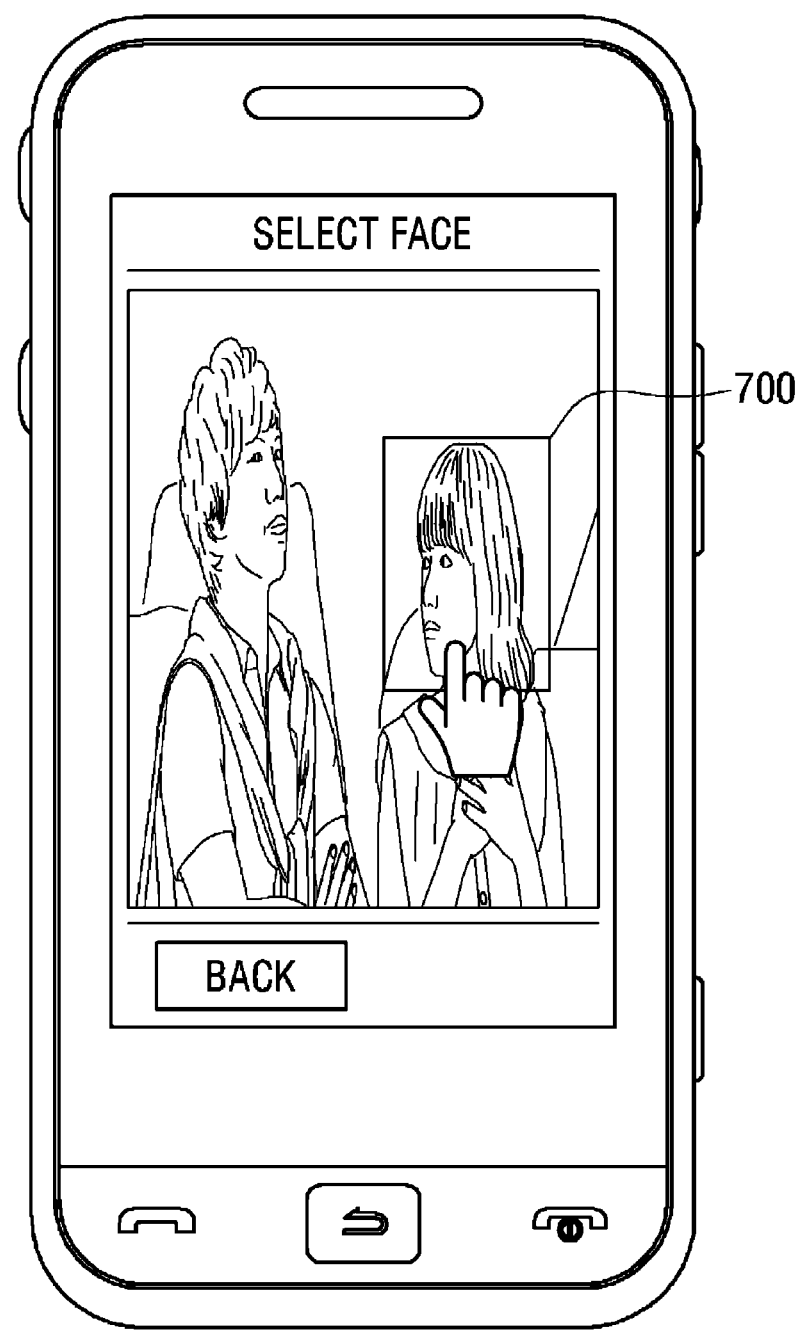
FIGS. 7A to 7E illustrate a process of registering a photo in an address book by matching a portion of a face in a photo on a screen with an existing figure in the address book according to an embodiment of the present invention.

FIG. 7A illustrates a photo including a plurality of faces displayed on the screen of the image pickup apparatus 100. As illustrated in FIG. 7A, if a user touches a first face 700, the image pickup apparatus 100 receives a command to select the first face 700. The image pickup apparatus 100 extracts and selects the area of the first face 700 using face recognition technology.

Figure 7B:
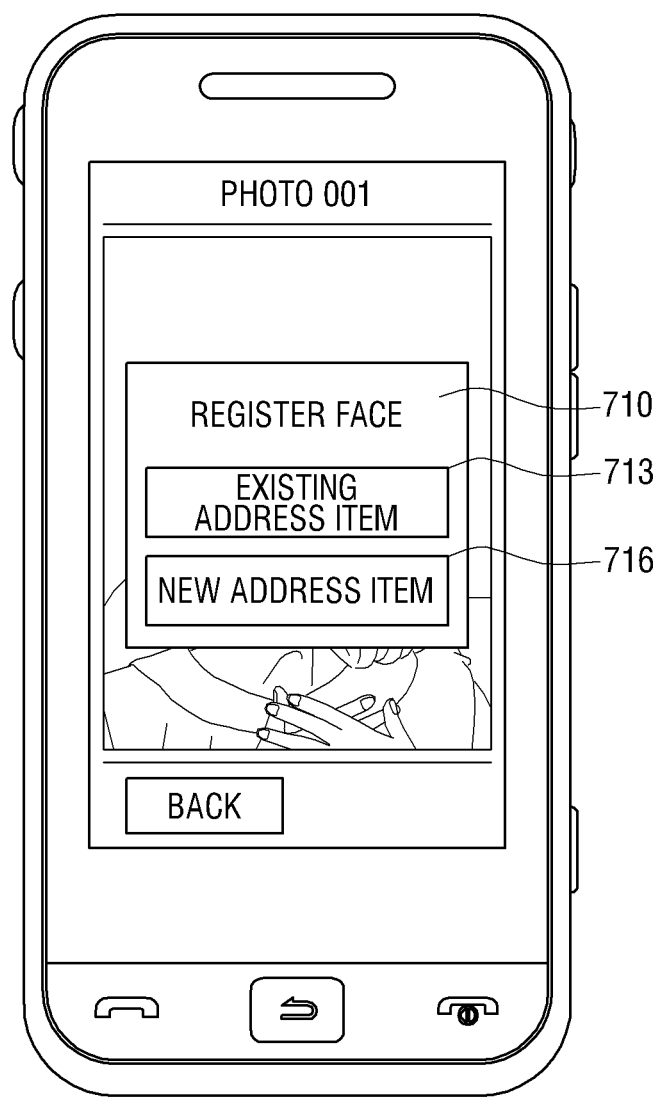

Subsequently, as illustrated in FIG. 7B, a face registration menu 710 to register the selected first face 700 is displayed. As illustrated in FIG. 7B, the face registration menu includes an existing address item 713 and a new address item 716. Herein, the existing address item 713 is an item to receive a command to register a selected face photo to a location of one of the people stored in the current address book. The new address item 716 is an item to receive a command to register a selected face photo with a new figure in the address book.

Figure 7C:
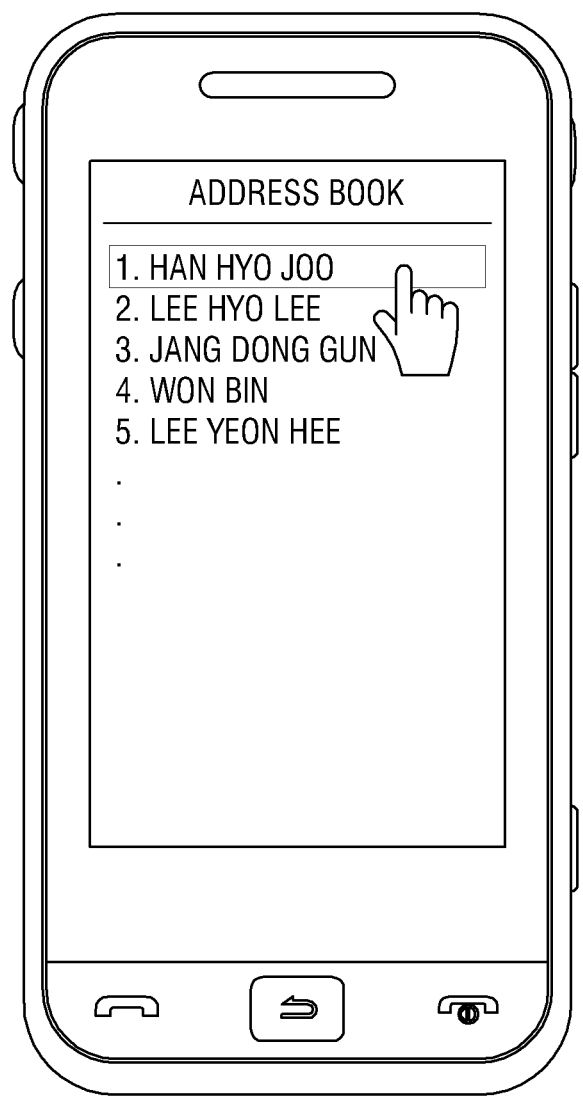
Figure 7D:
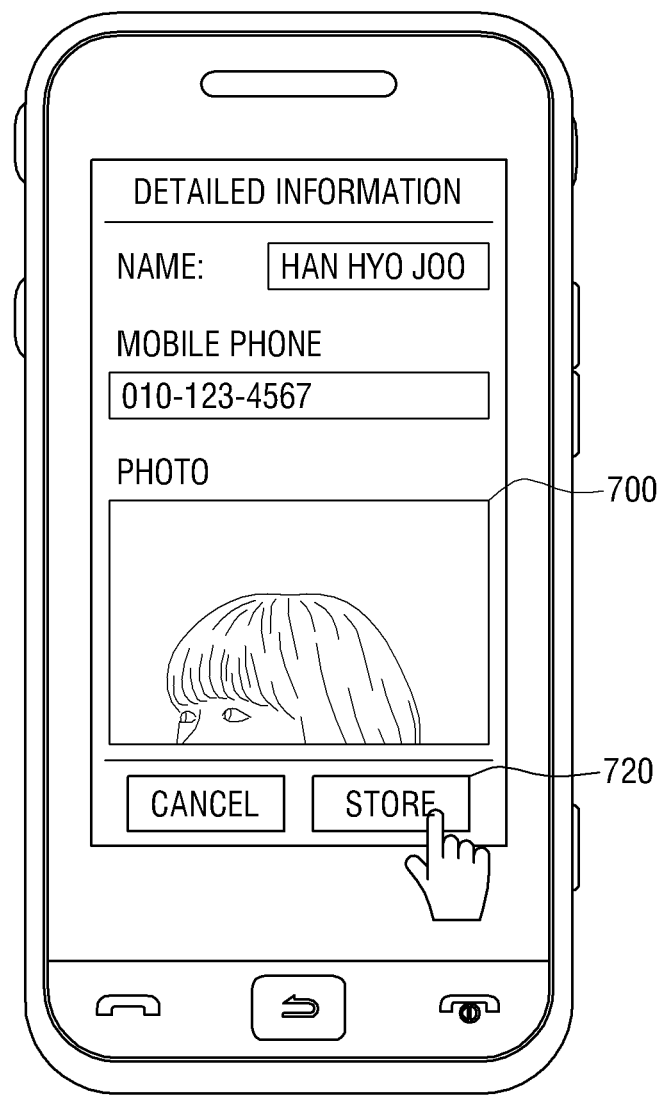
Figure 7E:
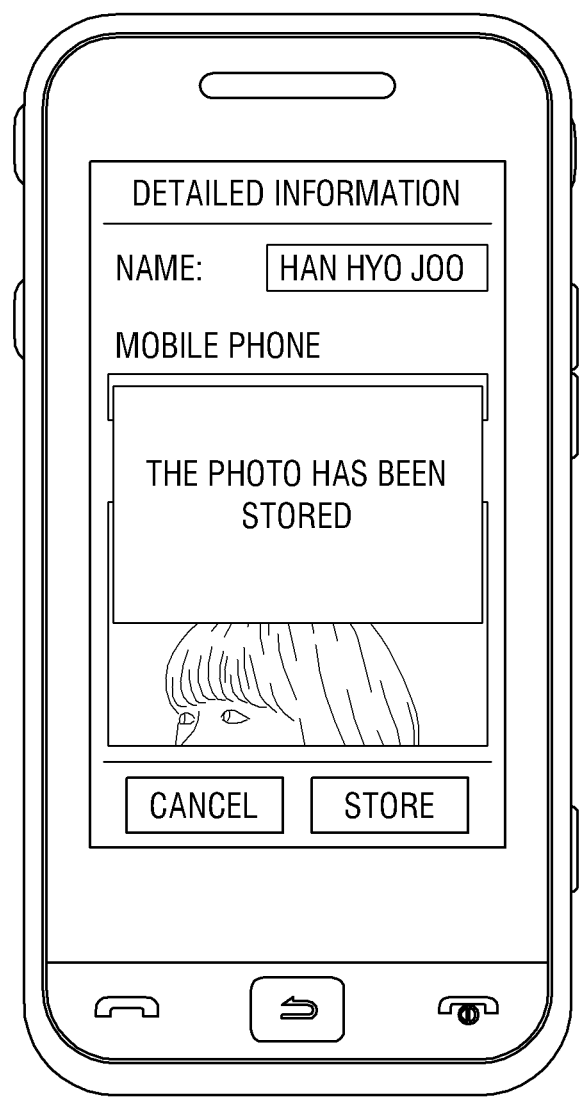

If a user selects the existing address item 713, the image pickup apparatus 100 displays a list of people stored in the current address book as illustrated in FIG. 7C. Herein, if the user selects "Han Hyo Joo" as illustrated in FIG. 7D, the image pickup apparatus 100 matches the photo of the first face 700 to "Han Hyo Joo" to the address information. As illustrated in FIG. 7D, if the user touches the store button 720, the image pickup apparatus 100 stores the photo of the first face 700 by matching the photo of the first face 700 to "Han Hyo Joo" in the address information. Subsequently, a storage confirmation message is displayed as illustrated in FIG. 7E.

Figure 7F:
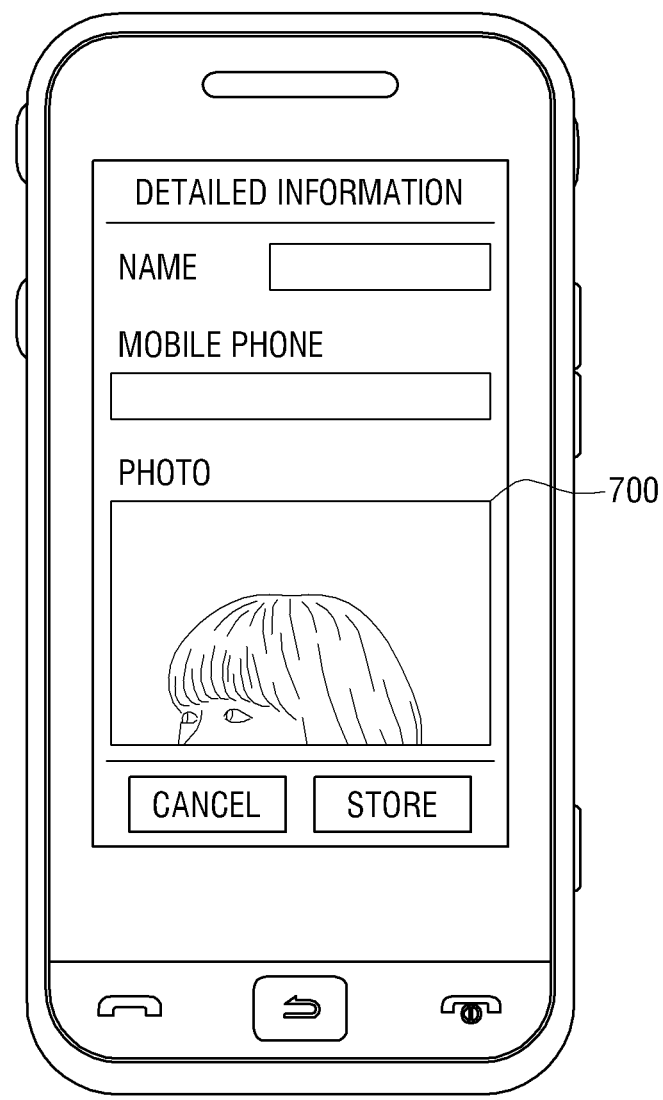
FIGS. 7F to 7H illustrate a process of registering a photo in an address book by matching a portion of a face in a photo on a screen with a new figure in the address book according to an embodiment of the present invention.
Figure 7G:
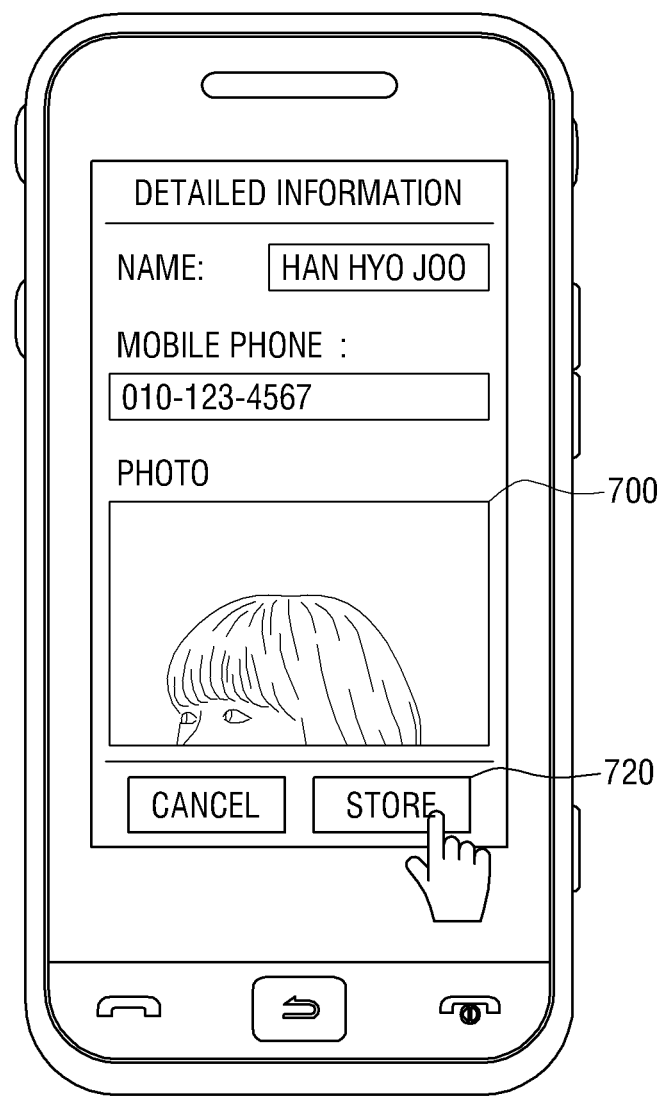
Figure 7H:
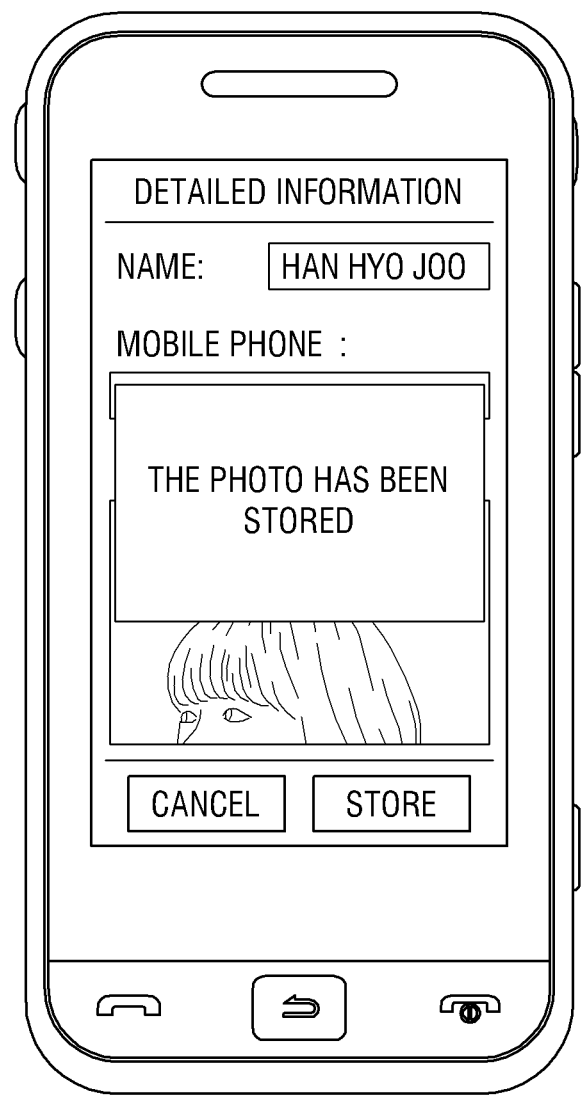

FIGS. 7F to 7H illustrate a process of registering a photo in an address book by matching a portion of a face in a photo on a screen with a new figure in the address book according to an embodiment of the present invention.

If a user selects the new address item 716 in FIG. 7B, the image pickup apparatus 100 displays a screen where a new figure is added to the address book as illustrated in FIG. 7F. It can be seen that the image pickup apparatus 100 stores the photo of the first face 700 by matching the photo of the first face 700 with the address information of the currently added figure. That is, if the new address item 716 is selected, the image pickup apparatus 100 stores the selected face photo by matching the photo with the information of the newly registered figure.

As illustrated in FIG. 7G, if a user selects the store button 720 after inputting the name and phone number of a new figure, the image pickup apparatus 100 stores the name and phone number of the newly input figure by matching them with the photo of the first face 700. Subsequently, a message for informing that the image has been stored is displayed as illustrated in FIG. 7H.

By going through the above processes, the image pickup apparatus 100 may match a face included in a photo displayed on a screen with a newly registered figure in an address book.

Meanwhile, if a user touches a photo displayed on the screen of the image pickup apparatus 100 the image pickup apparatus 100 may perform other functions in addition to face registration function, which will be explained with reference to FIG. 7I.

Figure 7I:
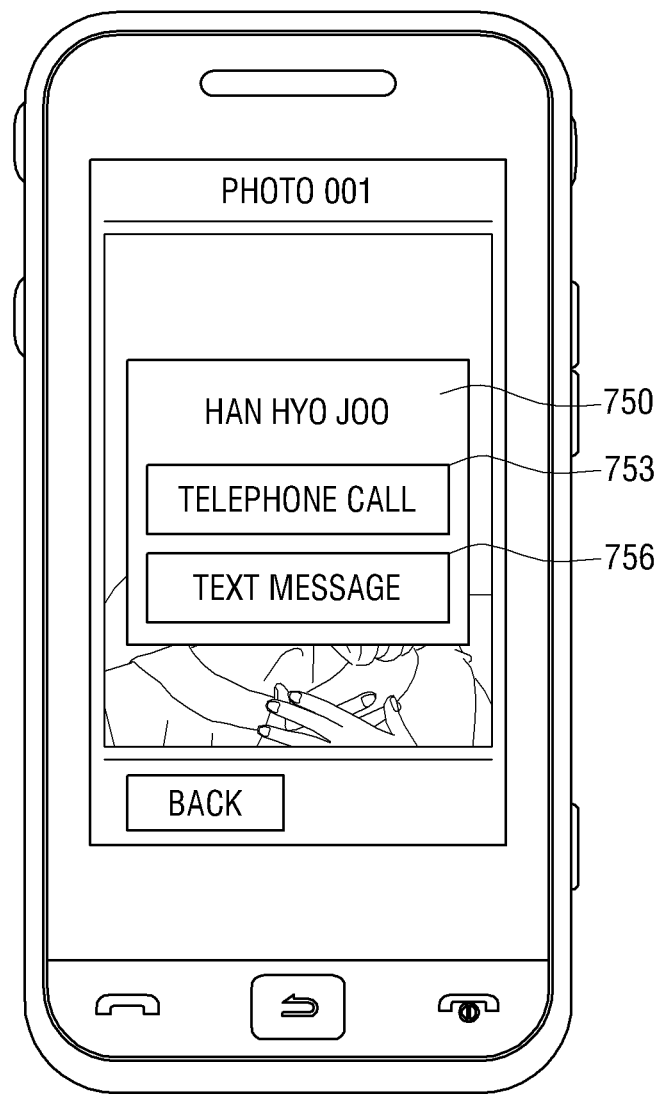
FIG. 7I illustrates a screen on which a menu regarding a selected figure is displayed when a face of a photo is selected according to an embodiment of the present invention.

FIG. 7I illustrates a screen where a menu for selected figure 750 is displayed when a face area is selected in a photo.

As illustrated in FIG. 7A, if a user touches the first face 700, the image pickup apparatus 100 may display the menu for selected figure 750 as illustrated in FIG. 7I. The menu for selected figure 750 is a menu to display functions that can be performed with regard to the selected figure if the figure selected by the user exists in the address book.

As illustrated in FIG. 7I, the menu for selected figure 750 includes a telephone call item 753 and a text message item 756. That is, the image pickup apparatus 100 makes a telephone call or sends a text message to a person corresponding to the first face 700. As such, if a face included in a photo is selected by the user, the image pickup apparatus 100 may provide a menu for performing functions with regard to the person corresponding to the face selected by the user. Accordingly, the user may make a telephone call or send a text message to the person corresponding to the selected face by selecting the face in the photographed image.

In the above embodiment, the address book is stored in the storage unit 190 included in the image pickup apparatus 100, but this is only an example. The image pickup apparatus 100 may use an address book stored in an external apparatus. In this case, the image pickup apparatus 100 downloads the address book from the external apparatus through wired or wireless communication temporarily and uses the downloaded address book. Alternatively, the image pickup apparatus 100 may connect the external apparatus and search whether the external apparatus includes information regarding a desired figure only when there is no information regarding the desired figure in the address book stored in the storage unit 190.

Meanwhile, in the above embodiment, the image pickup apparatus 100 transmits a photographed image to an e-mail, but this is only an example. The image pickup apparatus 100 may transmit the photographed image to other apparatuses of a corresponding figure. In this case, the other apparatuses of a corresponding figure have a history of being connected to the image pickup apparatus 100. Since there is a record of the other apparatuses being connected to the image pickup apparatus 100 and thus the image pickup apparatus 100 has a record of IP addresses or MAC addresses of the other apparatuses, the image pickup apparatus 100 may communicate with the other apparatuses easily. Examples of other apparatuses include an electronic frame, a digital camera and a television. The image pickup apparatus 100 recognizes that the user of other apparatuses is a person to whom a photographed image should be sent based on owner information and apparatus information of the other apparatuses. Accordingly, the image pickup apparatus 100 may transmit the photographed image to the other apparatuses of the corresponding person.

Meanwhile, in the above embodiment, the image pickup apparatus 100 recognizes a face in a photographed image, but this is only an example. The image pickup apparatus 100 may recognize a face in a stand-by status before photographing. Herein, the stand-by status represents a status where an image of a subject is displayed on the display screen of the image pickup apparatus 100 before photographing. In this case, the display unit 170 displays an image photographed by the image pickup element 120 in the stand-by mode on the screen. Subsequently, the display unit 170 marks a face on the screen in the stand-by mode with a box, which is an indicator. The image processing unit 130 recognizes at least one face in an image photographed by the image pickup element 120 in the stand-by mode.

As such, the image pickup apparatus 100 recognizes a face in the stand-by mode, and thus a user may select a face displayed on the screen in the stand-by mode. If a user selects a face displayed on the screen in the stand-by mode, the image pickup apparatus 100 performs functions related to a figure corresponding to the selected face. For example, if a specific face is selected in the stand-by mode, the image pickup apparatus 100 may display address information of a person corresponding to the selected face on the screen. In addition, if a specific face is selected in the stand-by mode, the image pickup apparatus 100 may make a telephone call or send a text message to a person corresponding to the selected face.

As the image pickup apparatus 100 performs functions related to a figure corresponding to the selected face in the stand-by mode as described above, a user may make a telephone call or send a text message to a desired person simply by viewing the desired person with the image pickup apparatus 100 in the stand-by mode.

In the above embodiment, when the image pickup apparatus 100 transmits a photo to a specific person, the image pickup apparatus 100 may also recommend another person to whom the photo is transmitted together. Herein, the other persons are preferably those close to the specific person. The image pickup apparatus 100 also sets the level of intimacy among people registered in the address book. The more a person appears in a photo with another person, the higher the level of intimacy. For example, suppose there are three people A, B, and C. If there are five photos where A and B appear together, six photos where B and C together, and eight photos where C and A appear together, C and A have the highest level of intimacy. Accordingly, if the image pickup apparatus 100 transmits a photographed image to C, the image pickup apparatus 100 may recommend A as a person to receive the photographed image together. As such, when the image pickup apparatus 100 transmits a photo to a specific person, the image pickup apparatus 100 may recommend another person to whom the photo is also transmitted.

Hereinafter, a process of searching contents through face recognition and transmitting/receiving the contents will be described with reference to FIGS. 1 and 8 to 13D.

Referring to FIG. 1, the storage unit 190 stores various multi-media contents. Specifically, the storage unit 190 stores photo contents, video contents, music contents, and document contents. Such contents may be contents photographed directly from the image pickup apparatus 100 or contents downloaded from an external apparatus.

In addition, the storage unit 190 stores images photographed from the image pickup element 120 in a compressed form. In addition, the storage unit 190 stores an address book. Herein, the address book contains at least one of a name, address, e-mail address, and phone number. In addition, the address book stores a photo of each person.

Furthermore, the storage unit 190 stores information regarding apparatuses and the users of the apparatuses by matching them with one another. Herein, the information regarding apparatuses represents distinct information regarding apparatuses and may include at least one of an apparatus ID, IP address, MAC address, and serial number. The information regarding users represents distinct information regarding users and may include a user ID, user name, telephone number, e-mail address, user photo, and data regarding characteristics of a user face.

The storage unit 190 may be realized using a flash memory, hard disk or DVD.

The communication unit 195 may receive multi-media contents files from external apparatuses.

The controller 140 controls overall operation of the image pickup apparatus 100. Specifically, if the image pickup apparatus 100 operates as a contents receiving end, the controller 140 controls to transmit information regarding a user and an apparatus to an external apparatus and to receive a photo or video corresponding to the user information from the external apparatus.

The controller 140 controls to receive a contents list from an external apparatus. In addition, the controller controls to display the received contents list on the screen.

The controller selects contents to be downloaded according to a user's manipulation. The controller 140 transmits a request for download along with contents selection information to an external apparatus. Herein, the contents selection information represents information regarding contents selected by a user from among contents included in the contents list and includes a title and a distinct number of the selected contents.

Subsequently, the controller 140 controls to receive the selected contents from the external apparatus.

Meanwhile, if the image pickup apparatus 100 operates as a contents transmitting end that transmits contents to an external apparatus, the controller 140 performs the following functions.

The controller 140 controls to transmit information regarding a user and apparatus to an external apparatus. In addition, the controller 140 recognizes the type and characteristics of the external apparatus using the apparatus ID and serial number in the apparatus information. The controller 140 performs communication-related settings with the external apparatus using the IP address and MAC address in the apparatus information.

Furthermore, the controller 140 searches contents corresponding to the user information of the external apparatus from among contents stored in the storage unit 190. Specifically, the controller 140 extracts data regarding characteristics of a user face based on the received user information of the external apparatus.

The data regarding characteristics of a face may be included in the user information, or may be extracted from a user's photo included in the user information or using a face recognition function. In addition, the data regarding characteristics of a face may be extracted from a user's photo included in an address book stored in the storage unit 190. Specifically, the controller 140 searches whether a user of the external apparatus is included in an address book stored in the storage unit 190 based on the user information of the external apparatus. If it is determined that the user of the external apparatus is included in the address book, the controller 140 may extract data regarding characteristics of the face of the user of the external apparatus using the user's photo included in the address book stored in the storage unit 190.

In addition, the controller 140 searches photo contents and video contents including a face of the user of the external apparatus from among the stored contents using the data regarding face characteristics of the user of the external apparatus and the face recognition function. Subsequently, the controller 140 transmits a list of searched contents to the external apparatus.

The controller 140 also receives contents selection information and a download request from the external apparatus. In addition, the controller 140 transmits selected contents to the external apparatus.

As such, the controller 140 performs different functions depending on whether the image pickup apparatus 100 transmits contents or receives contents.

As described above, the image pickup apparatus 100 receives contents corresponding to user information from the external apparatus. Accordingly, a user may download a photo or video in which he or she is included easily from an external apparatus using the image pickup apparatus 100.

Figure 8:
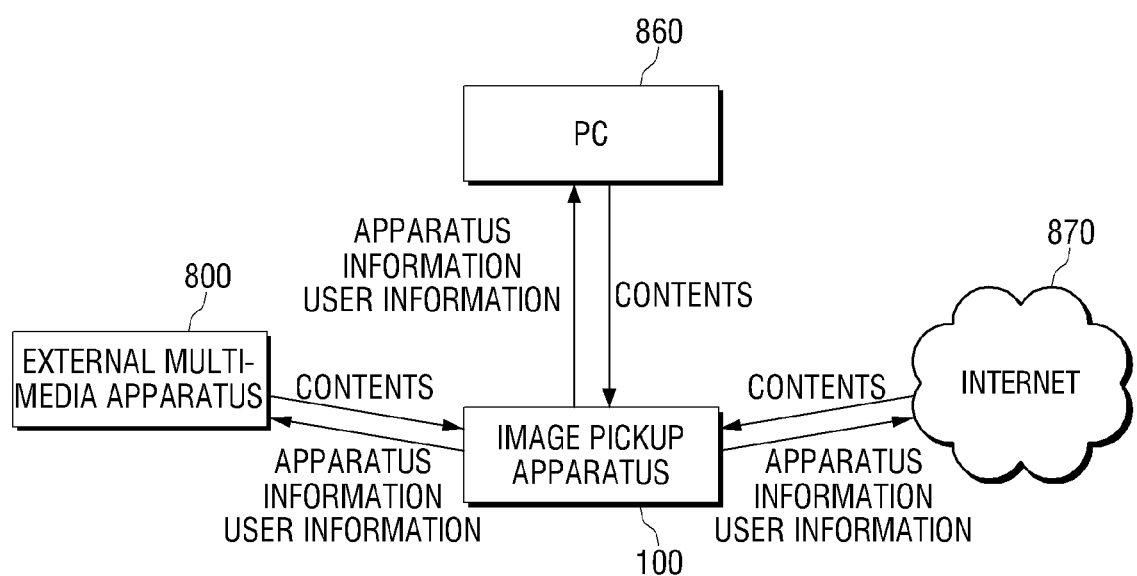
FIG. 8 illustrates a system in which an image pickup apparatus receives contents through an external multi-media apparatus, PC, or the Internet according to an embodiment of the present invention.

FIG. 8 illustrates a system in which the image pickup apparatus 100 receives contents through an external multimedia apparatus 800, a PC 860, or the Internet 870 according to an embodiment of the present invention Herein, the external multi-media apparatus 800 has a similar configuration and function with the image pickup apparatus in FIG. 1.

The image pickup apparatus 100 transmits information regarding the apparatus and its user to the external multi-media apparatus 800, the PC 860, or the Internet 870. The external multi-media apparatus 800, the PC 860, or the Internet 870 then searches photo or video contents in which a user's face is included based on the user information, and provides the image pickup apparatus 100 with the searched photo or video contents.

Specifically, the external multi-media apparatus 800, the PC 860, or the Internet 870 extracts data regarding a user's face characteristics based on the received user information of the image pickup apparatus 100. The data regarding characteristics of a face may be included in the user information, or may be extracted from a user's photo included in the user information or using the face recognition function.

In addition, the external multi-media apparatus 800, the PC 860, or the Internet 870 may determine whether a user is included in an address book based on the user information of the image pickup apparatus 100. In addition, the external multi-media apparatus 800, the PC 860, or the Internet 870 may extract data regarding characteristics of the face of the user of the image pickup apparatus 100 using a photo included in a stored address book.

Furthermore, the external multi-media apparatus 800, the PC 860, or the Internet 870 searches photo or video contents in which a user's face is included using data regarding characteristics of the face of the user of the image pickup apparatus 100, and transmits a list of the searched contents and the searched contents to the image pickup apparatus 100.

As such, the image pickup apparatus 100 may download photo or video contents in which a user's face is included in a lump by transmitting information regarding the apparatus and the user.

Figure 9:
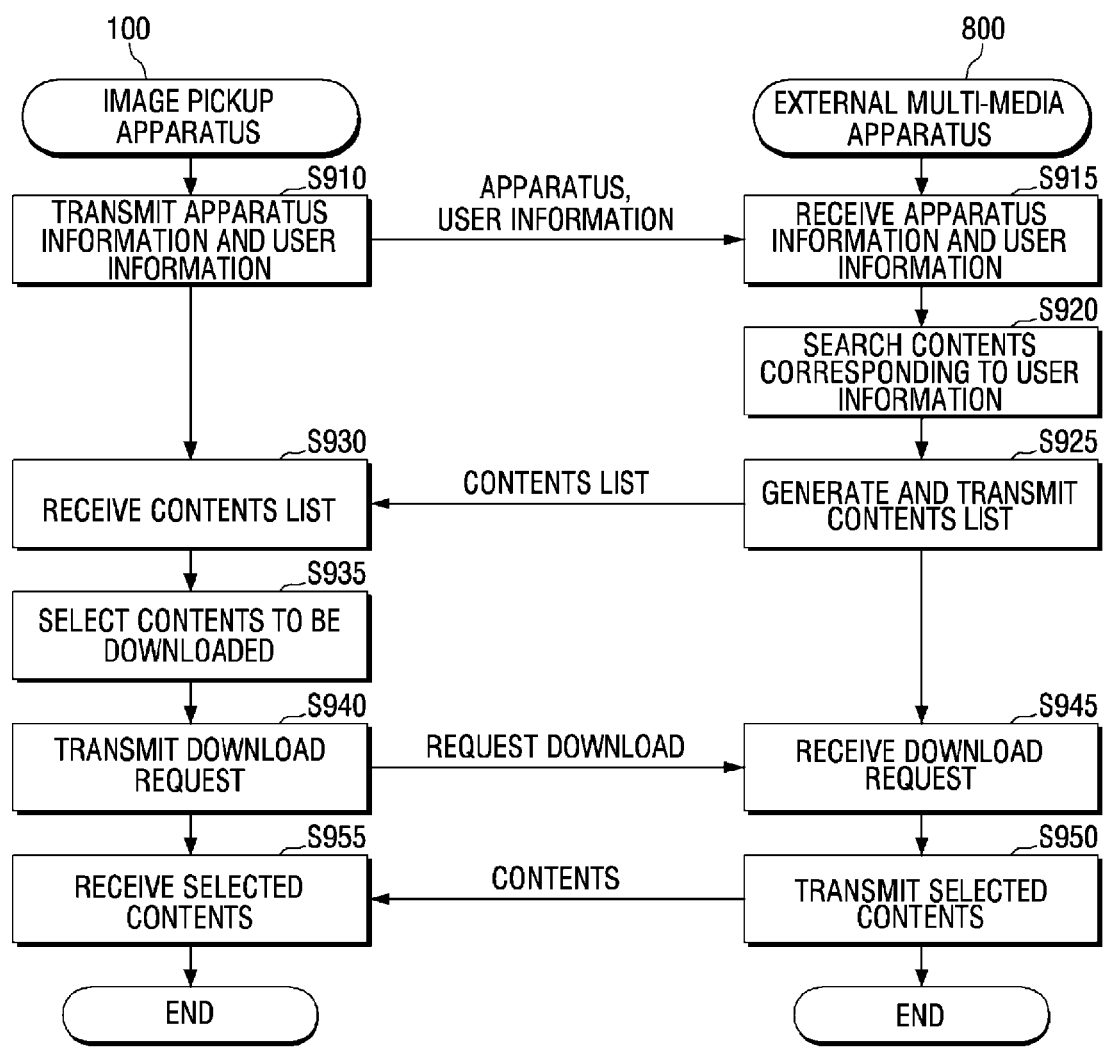
FIG. 9 is a flowchart illustrating an operation of an image pickup apparatus and an external multi-media apparatus according to an embodiment of the present invention.

Hereinafter, operations of the image pickup apparatus 100 and the external multi-media apparatus 800 will be explained in detail with reference to FIG. 9. FIG. 9 is a flowchart describing operations of the image pickup apparatus 100 and the external multi-media apparatus 800 according to an embodiment of the present invention.

First of all, the image pickup apparatus 100 transmits information regarding the apparatus and its user to the external multi-media apparatus 800 in step S910. Subsequently, the external multi-media apparatus 800 receives the information regarding the apparatus and its user of the image pickup apparatus 100 in step S915. The external multi-media apparatus 800 recognizes the type and properties of the image pickup apparatus 100 using the apparatus ID and serial number in the apparatus information. In addition, the external multi-media apparatus 800 performs communication-related settings of the image pickup apparatus 100 using the IP address and MAC address in the apparatus information.

The external multi-media apparatus 800 searches contents corresponding to the user information of the image pickup apparatus 100 in step S920. Specifically, the external multi-media apparatus 800 extracts data regarding characteristics of a user face based on the received user information of the image pickup apparatus 100.

The data regarding characteristics of a face may be included in the user information, or may be extracted from a user's photo included in the user information or using the face recognition function. Alternatively, the data regarding characteristics of a face may be extracted from the user's photo included in the address book stored in the external multi-media apparatus 800. Specifically, the external multi-media apparatus 800 searches whether the user of the image pickup apparatus 100 is included in the stored address book based on the user information of the image pickup apparatus 100. If it is determined that the user of the image pickup apparatus 100 is included in the address book, the external multi-media apparatus 800 may extract data regarding characteristics of the user's face using the user's photo included in the stored address book stored.

In addition, the external multi-media apparatus 800 searches photo contents and video contents including a face of the user of image pickup apparatus 100 from among the stored contents using the data regarding characteristics of the face of the user of the image pickup apparatus 100 and the face recognition function.

Subsequently, the external multi-media apparatus 800 transmits a list of searched contents to the image pickup apparatus 100 in step S925. The image pickup apparatus 100 then receives the contents list from the external multi-media apparatus 800 in step S930.

The image pickup apparatus 100 displays the received contents list on the screen, and selects contents to be downloaded according to a user's manipulation in step S935. Subsequently, the image pickup apparatus 100 transmits contents selection information along with a request to download the selected contents to an external multi-media apparatus in step S940. Herein, the contents selection information represents information regarding contents selected by the user from among contents included in the contents list and includes the title and distinct number of the selected contents.

Subsequently, the external multi-media apparatus 800 receives the contents selection information and the request to download the selected contents from the image pickup apparatus 100 in step S945. The external multi-media apparatus 800 transmits the selected contents to the image pickup apparatus 100 in step S950, and the image pickup apparatus 100 then receives the selected contents from the external multi-media apparatus 800 in step S955.

By going through the above processes, the image pickup apparatus 100 receives contents corresponding to the user information from the external multi-media apparatus 800. Accordingly, a user may download a photo or video including his or her face from the external multi-media apparatus 800 easily using the image pickup apparatus 100.

In the above embodiment of the present invention, contents including the face of the user of the image pickup apparatus 100 are received, but this is only an example. Contents including the face of another person may also be received.

In this case, the image pickup apparatus 100 transmits the portrait photo of a person selected by the user to the external multi-media apparatus 800. Subsequently, the external multi-media apparatus 800 extracts data regarding characteristics of the face from the received portrait photo, and searches photo contents and video contents including the face of the selected person from among stored contents. The external multi-media apparatus 800 transmits the searched photo contents and video contents of the selected person to the image pickup apparatus 100. Accordingly, the image pickup apparatus 100 may receive the contents including the face of another person, not the user of the image pickup apparatus 100 from the external multi-media apparatus 800.

In the above embodiment of the present invention, the image pickup apparatus 100 receives contents from the external multi-media apparatus 800, but this is only an example. The image pickup apparatus 100 may receive contents from any external apparatus that can recognize the face and store multi-media contents. For example, an external apparatus may be realized as an external PC and any apparatus that can be connected through the Internet.

Figure 10A:
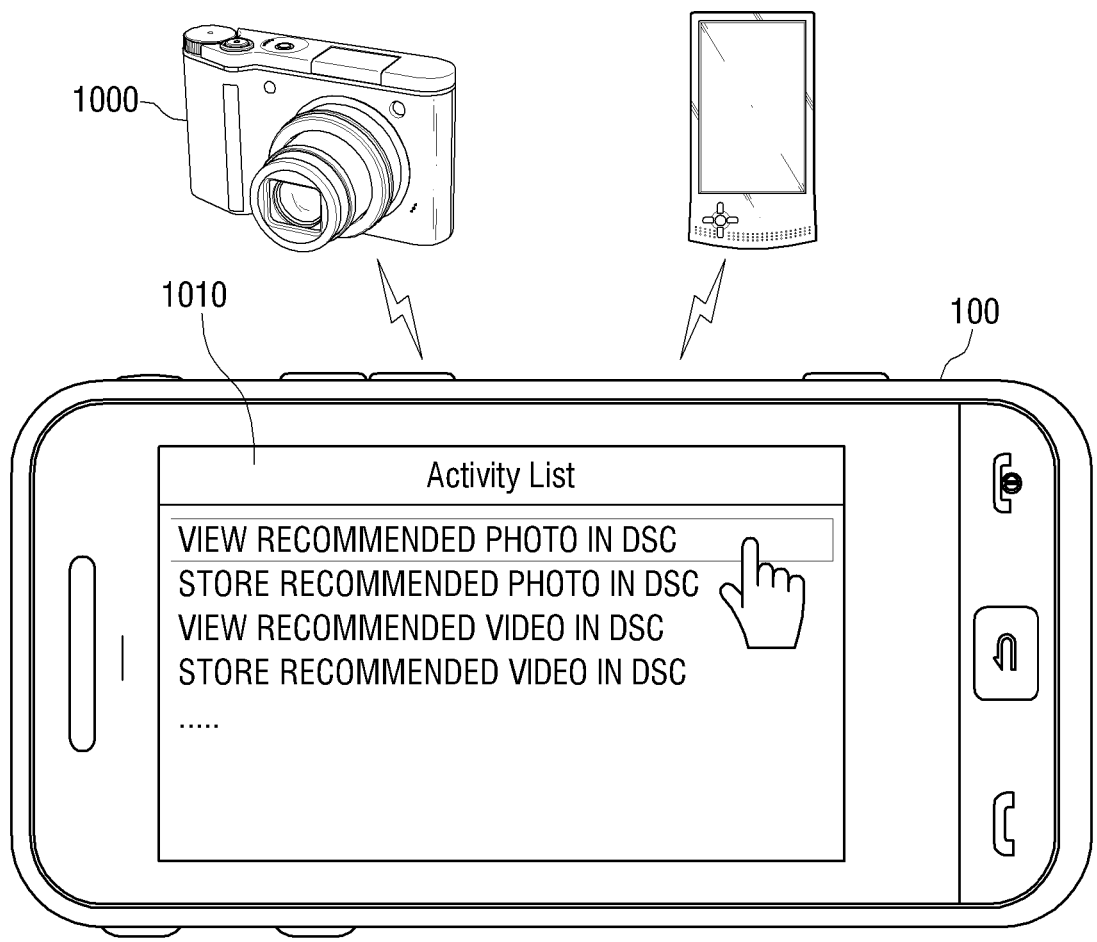
FIG. 10A illustrates a menu screen to receive contents from an external multi-media apparatus, such as a digital still camera (DSC), according to an embodiment of the present invention.
Figure 10B:
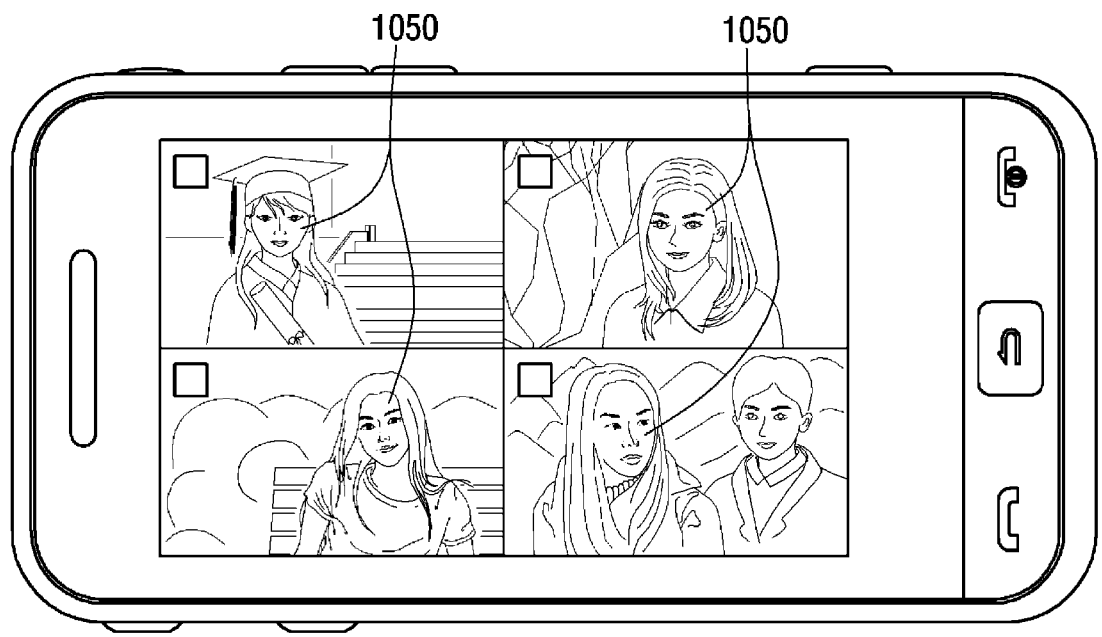
FIG. 10B illustrates a screen on which a list of photos including a user's face is displayed according to an embodiment of the present invention.

Hereinafter, a screen showing an actual operation of the image pickup apparatus 100 will be explained. FIG. 10A illustrates a menu screen to receive contents from a digital still camera (DSC) 1000 that is the external multi-media apparatus 800 according to an embodiment of the present invention. FIG. 10B illustrates a screen on which a list of photos including a user's face is displayed.

As illustrated in FIG. 10A, the image pickup apparatus 100 displays a menu 1010 to receive contents from the DSC 1000 on the screen. The menu 1010 includes items such as viewing a recommended photo in the DSC, storing a recommended photo in the DSC, viewing a recommended video in the DSC, and storing a recommended video in the DSC. Such items are to be chosen by the user, and the image pickup apparatus receives a command from the user to display and download a photo or video including the face of the user of the image pickup apparatus 100 from among contents stored in the DSC 1000.

As illustrated in FIG. 10A, if a user selects 'view recommended photo in DSC' in the menu 1010, the image pickup apparatus 100 receives a list of photo contents including the user's face from the DSC 1000. Subsequently, the image pickup apparatus 100 displays a list of photos including the user's face 1050 on the screen as illustrated in FIG. 10B.

If the user selects a desired photo from the photo list in FIG. 10B, the image pickup apparatus 100 downloads the selected photo from the DSC 1000. As illustrated in FIG. 10B, all the photos in the photo list contain the user face 1050.

Figure 11A:
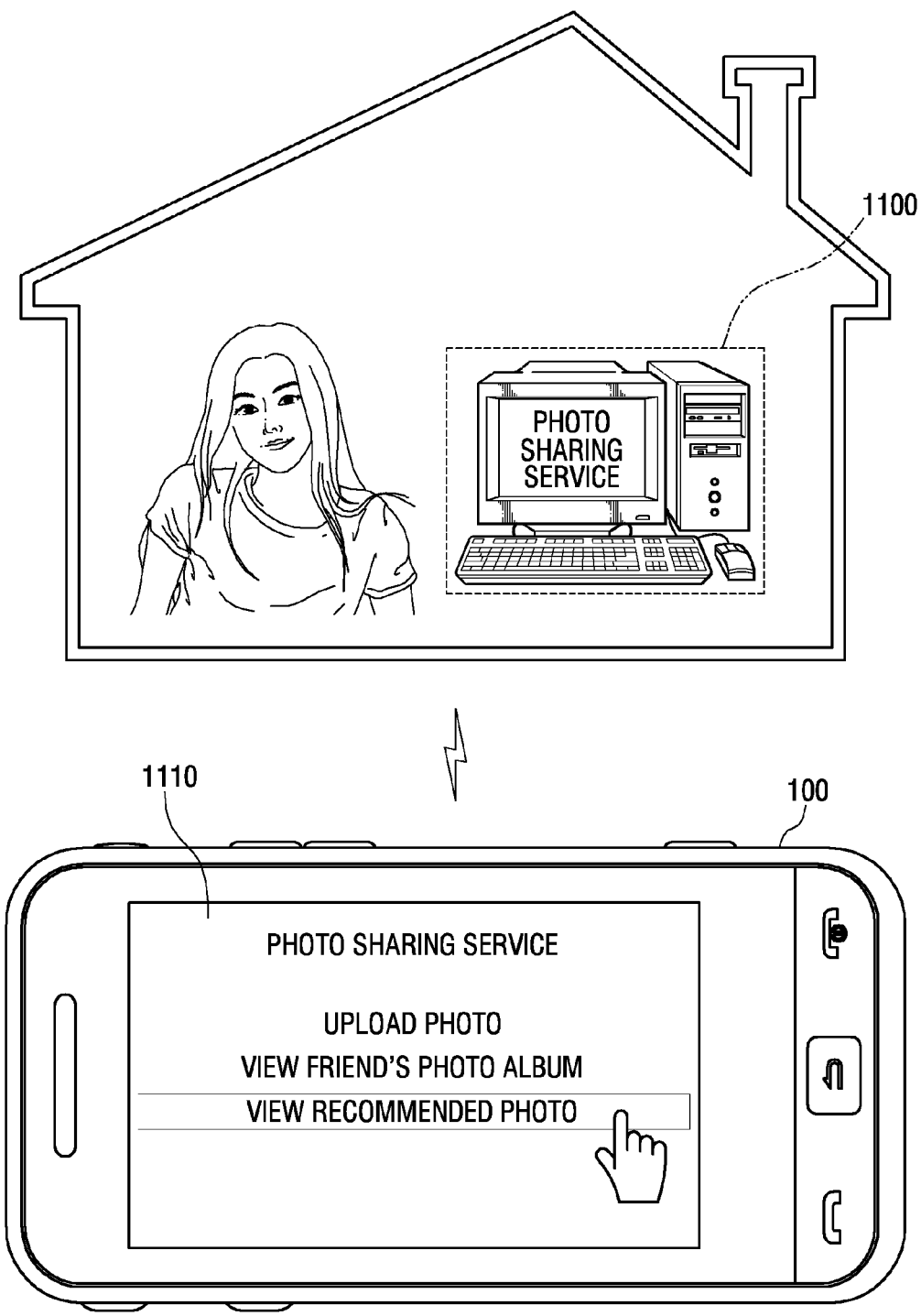
FIG. 11A illustrates a screen on which a menu to receive contents from an external multi-media apparatus, such as a PC, according to an embodiment of the present invention.
Figure 11B:
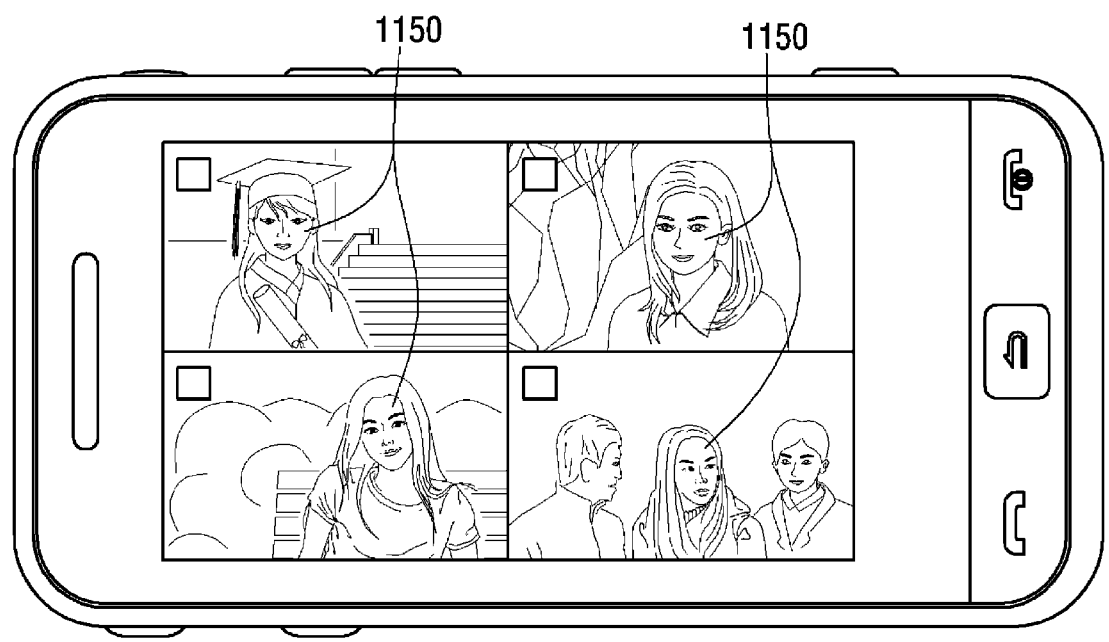
FIG. 11B illustrates a screen on which a list of photos including a user's face is displayed according to an embodiment of the present invention.

FIG. 11A illustrates a screen on which a menu 1110 to receive contents from a PC 1100 which is the external multi-media apparatus 800 according to an embodiment of the present invention. FIG. 11B illustrates a screen on which a list of photos including a user's face is displayed.

As illustrated in FIG. 11A, the image pickup apparatus 100 displays a menu 1110 (that is, a menu for a photo sharing service) to receive contents from the PC 1100 on the screen. The menu 1110 includes items of uploading a photo, viewing a friend's photo album, and viewing a recommended photo. Herein, the item of viewing a recommended photo is chosen by the user, and the image pickup apparatus 100 receives a command from the user to display a list of photos including the face of the user of the image pickup apparatus from among contents stored in the PC 1100.

As illustrated in FIG. 11A, if a user selects 'view recommended photo' in the menu 1110, the image pickup apparatus 100 receives a list of photo contents including the user's face from the PC 1100. Subsequently, the image pickup apparatus 100 displays a list of photos including the user's face 1150 on the screen as illustrated in FIG. 11B.

If the user selects a desired photo from the photo list in FIG. 11B, the image pickup apparatus 100 downloads the selected photo from the PC 1100. As illustrated in FIG. 11B, all the photos in the photo list contain the user face 1150.

As such, the image pickup apparatus 100 receives photos including a user's face from an external multi-media apparatus in a lump. Accordingly, the user may download photos including his or her face from the external multi-media apparatus 800 easily through a simple manipulation of the image pickup apparatus 100.

Hereinafter, a process of registering a user's portrait photo in the image pickup apparatus 100 will be described with reference to FIGS. 12A to 12H. FIGS. 12A to 12H illustrate a process of registering the user's photo in the image pickup apparatus 100 using face recognition technology according to an embodiment of the present invention.

Figure 12A:
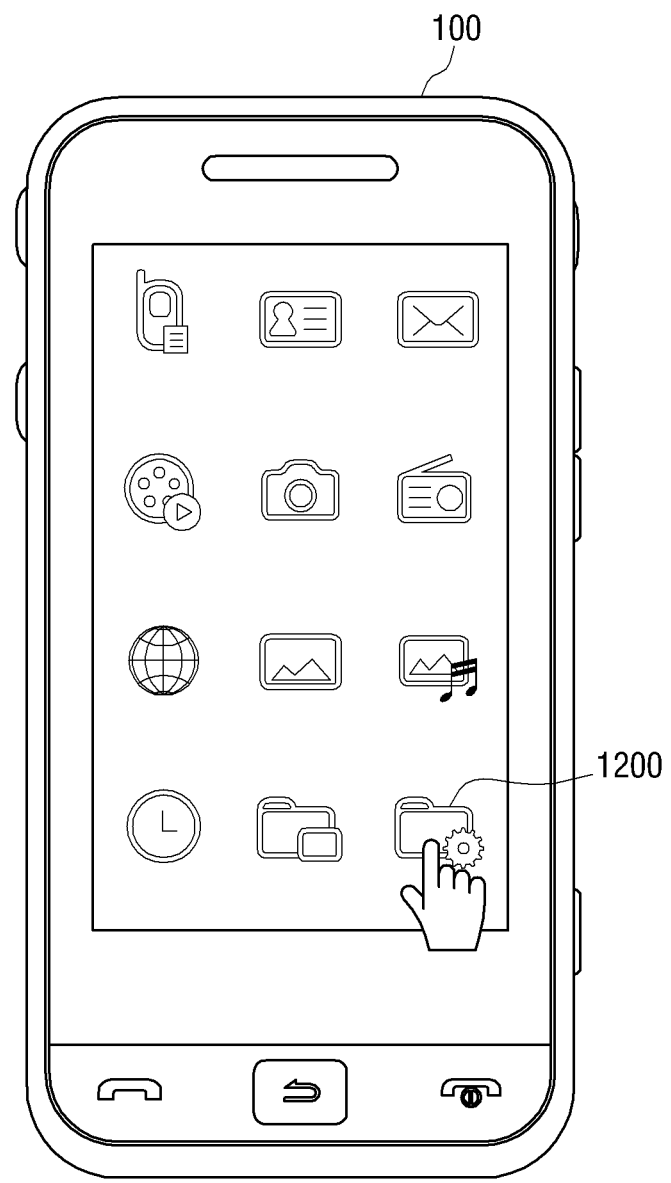
FIGS. 12A to 12H illustrate a process of registering a user's photo in an image pickup apparatus using face recognition technology according to an embodiment of the present invention.

As illustrated in FIG. 12A, the image pickup apparatus 100 displays a main menu on the screen. If a user touches a setting icon 1200, the image pickup apparatus 100 receives a selection command of the setting icon 1200 and displays a setting menu on the screen.

Figure 12B:
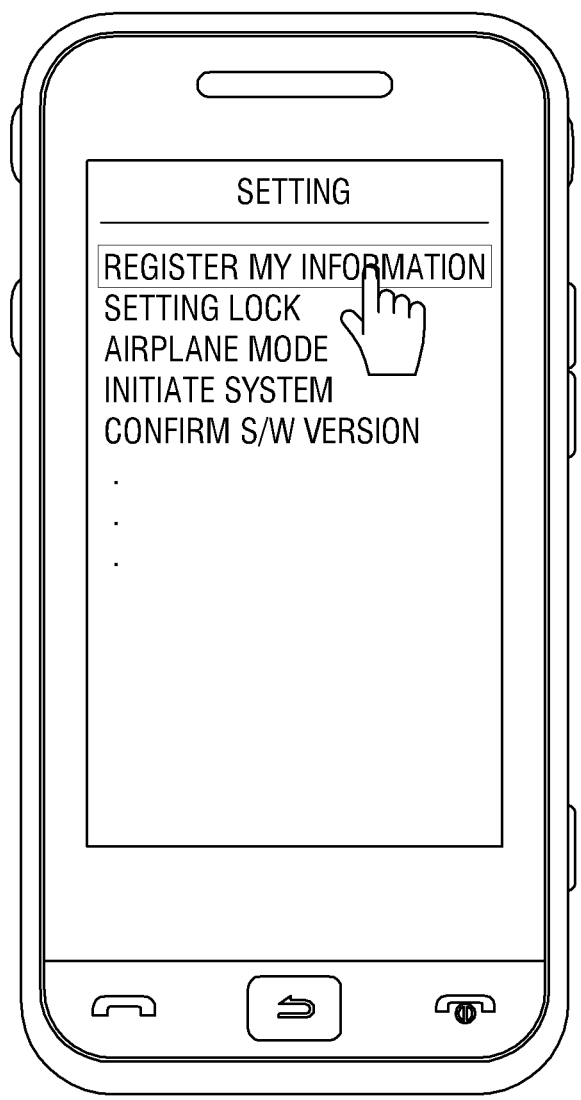

FIG. 12B illustrates a screen where a setting menu is displayed. As illustrated in FIG. 12B, if a user selects a "register my information" item on the setting menu, the image pickup apparatus 100 receives a selection command regarding the "register my information" item.

Figure 12C:
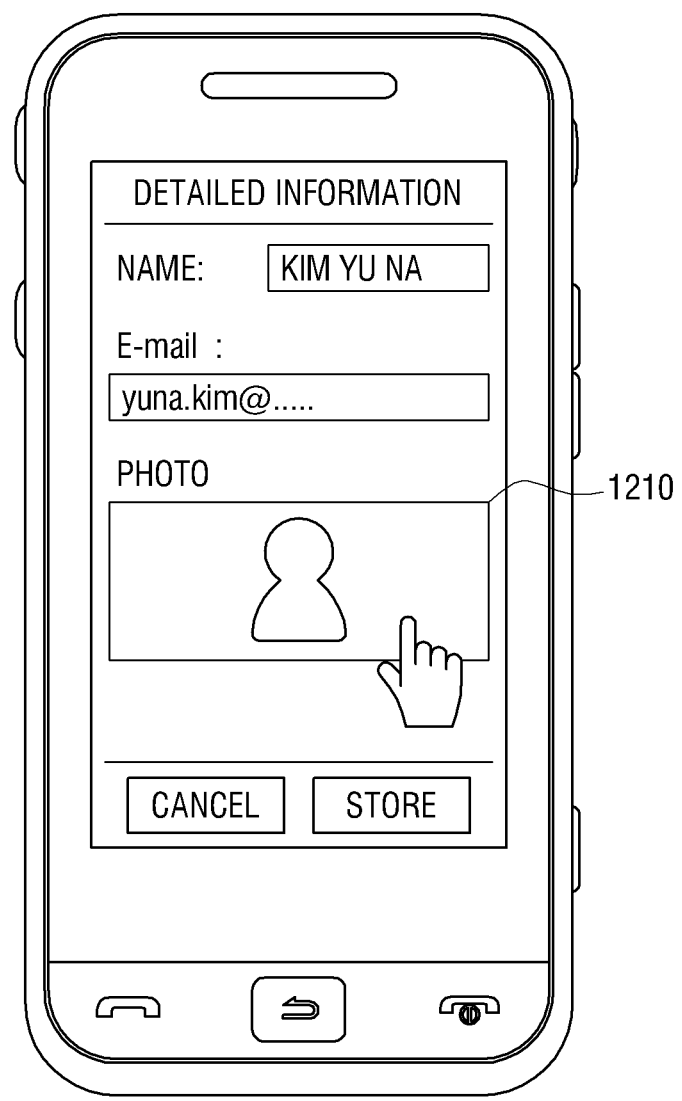

Accordingly, a screen for registering my information is displayed as illustrated in FIG. 12C. Herein, if the user registers his or her name and e-mail address and selects a photo registration button 1210, the image pickup apparatus performs a process of registering a photo. Herein, the photo registration process represents a process of registering the user's photo in the user information of the image pickup apparatus 100.

Figure 12D:
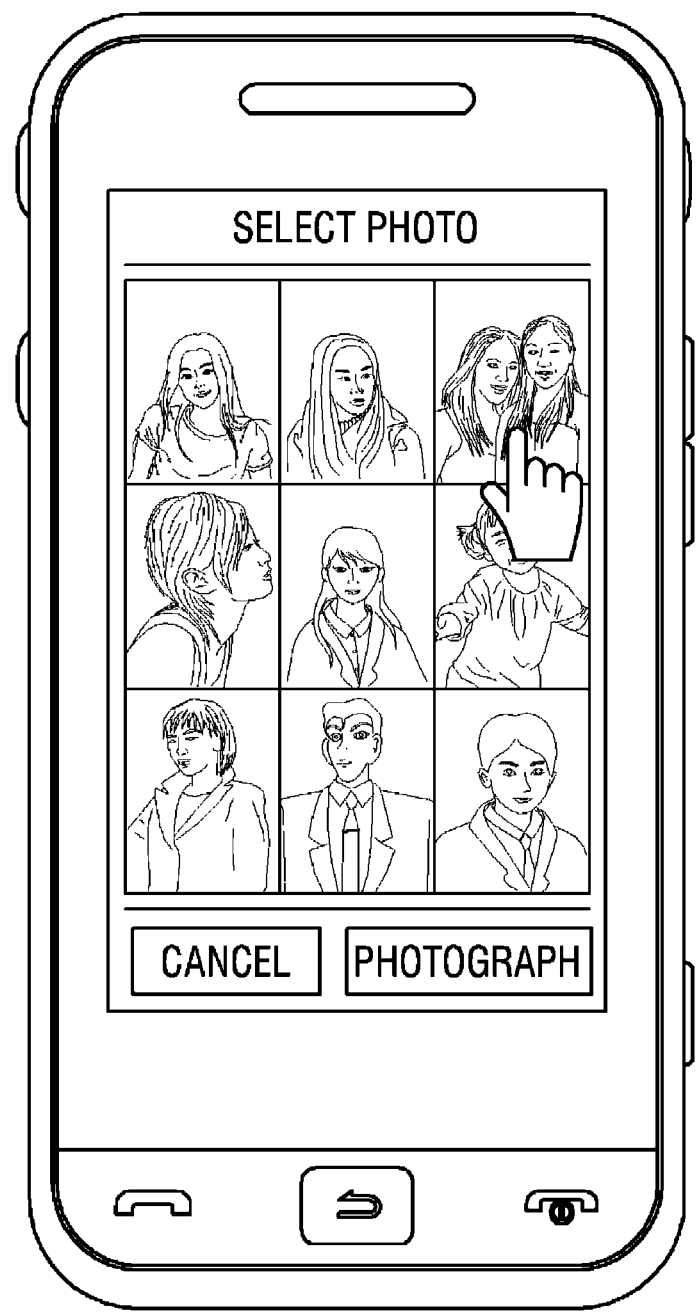

Accordingly, if the user selects the photo registration button 1210, the image pickup apparatus 100 displays photos as illustrated in FIG. 12D. As illustrated in FIG. 12D, if the user touches a desired photo from the displayed photos, the image pickup apparatus 100 receives a selection command for the touched photo. Accordingly, the image pickup apparatus 100 displays the selected photo in the full screen as illustrated in FIG. 12E.

Figure 12E:
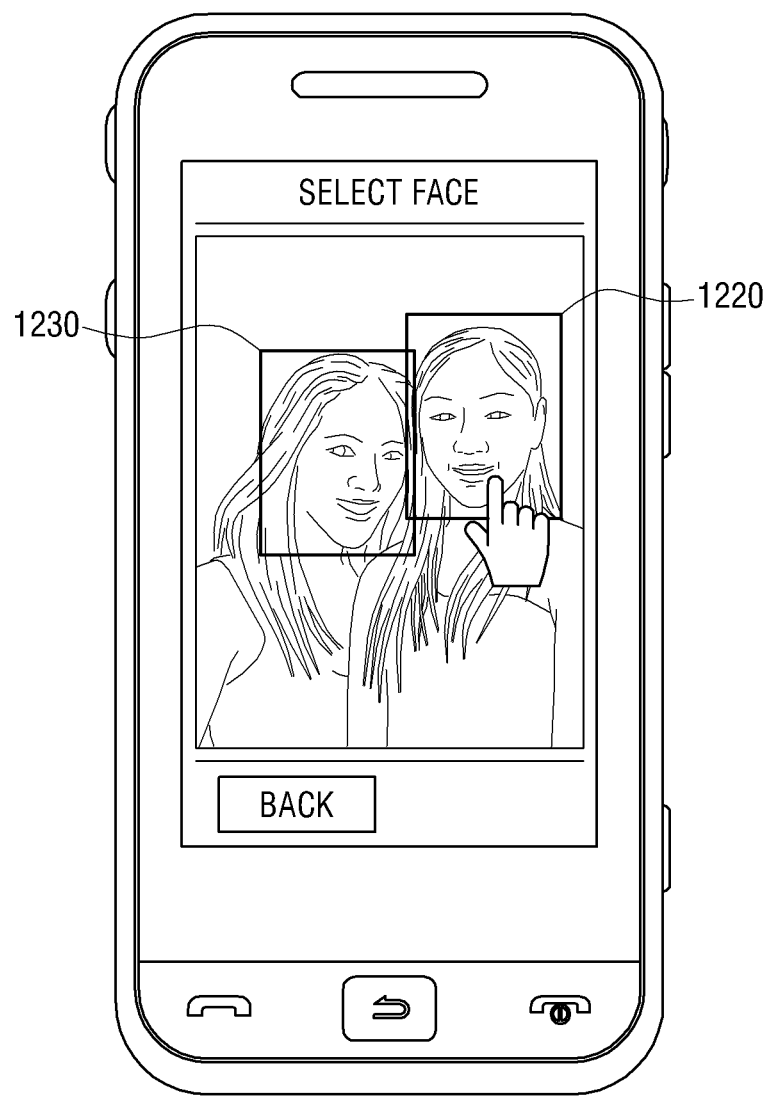

In addition, as illustrated in FIG. 12E, if faces are included in the selected photo, the image pickup apparatus 100 recognizes the faces included in the photo and displays an indicator around the faces. A first face 1220 and a second face 1230 are included in FIG. 12E, and it can be seen that the first face 1220 and the second face 1230 are each marked with a box.

Figure 12F:
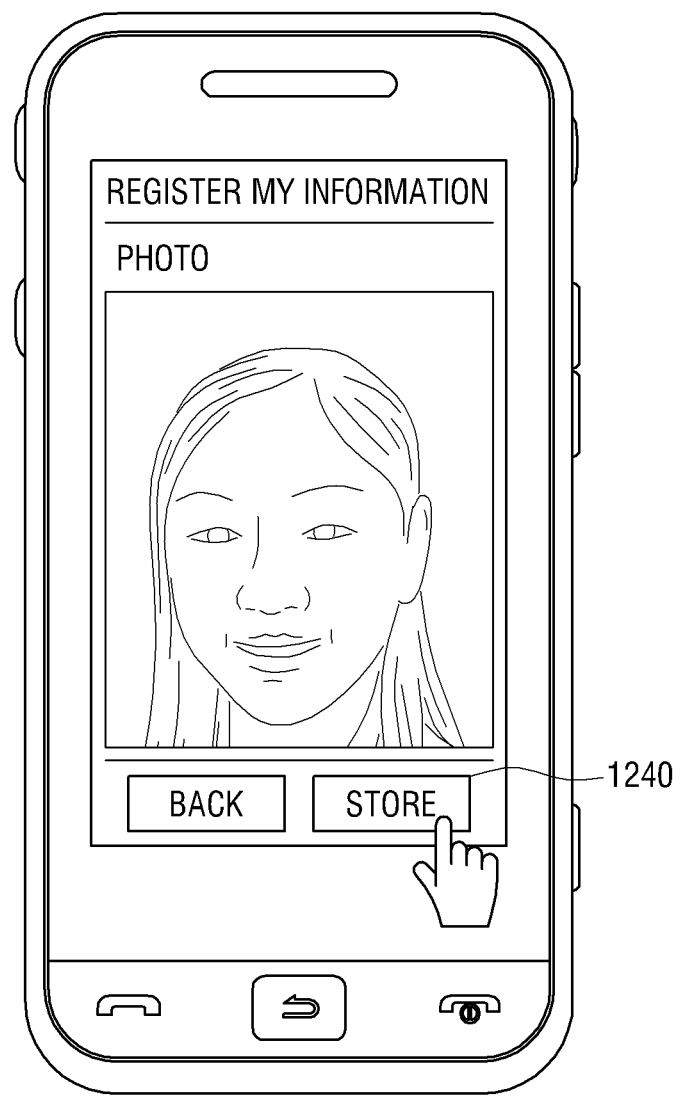

As illustrated in FIG. 12E, if a user touches the first face 1220, the image pickup apparatus 100 receives a command to select the first face 1220. Accordingly, the image pickup apparatus 100 displays the selected face on a separate screen as illustrated in FIG. 12F. In addition, as illustrated in FIG. 12F, a store button 1240 is displayed along with the photo of the first face 1220. Herein, the store button 1240 receives a command to store the selected portrait photo corresponding to the user information of the image pickup apparatus 100.

Figure 12G:
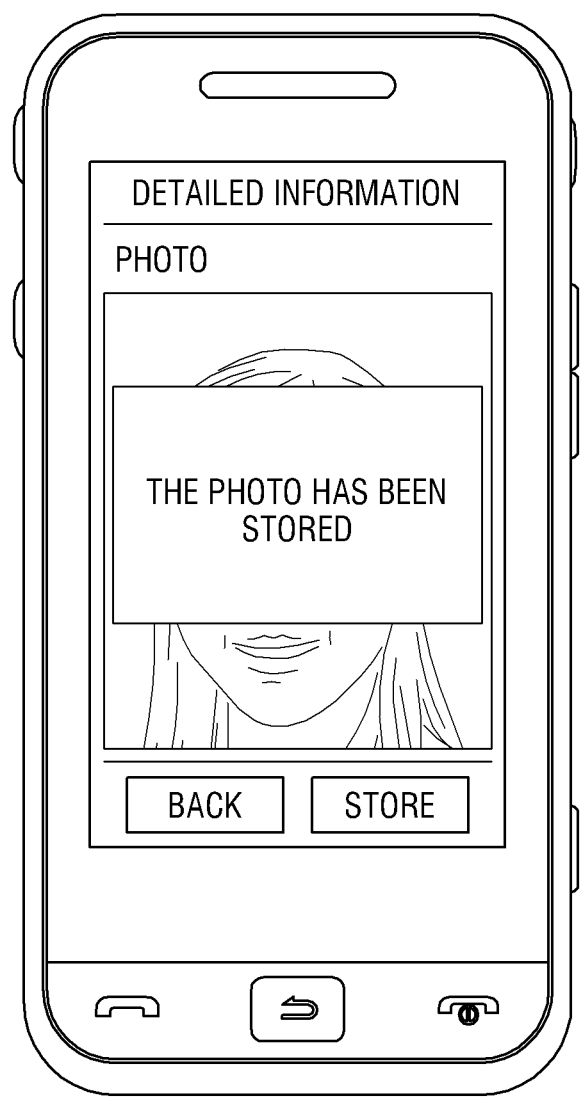
Figure 12H:
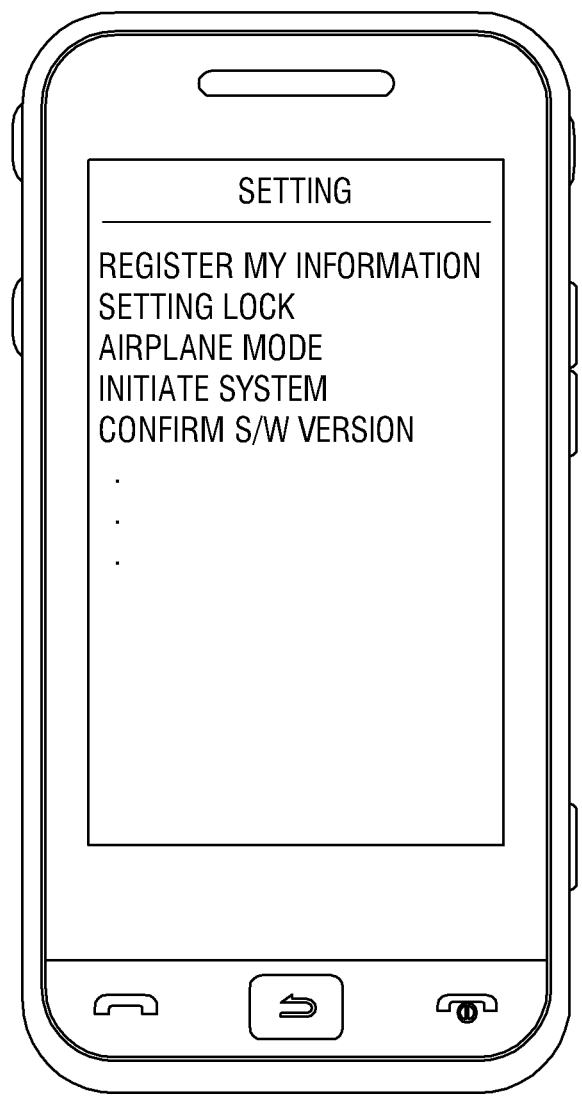

Accordingly, as illustrated in FIG. 12F, if a user touches the store button 1240, the image pickup apparatus 100 stores the first photo 1220 corresponding to the user information of the image pickup apparatus 100. Subsequently, as illustrated in FIG. 12G, a message to confirm the storage is displayed on the screen. After the photo registration is completed, a setting menu is displayed again on the screen as illustrated in FIG. 12H.

By going through the above processes, the image pickup apparatus 100 may register a photo stored in the image pickup apparatus 100 corresponding to the user information of the image pickup apparatus 100 using a face recognition function.

FIGS. 13A to 13D illustrate a process of taking a photo and registering the photo in the user information of the image pickup apparatus 100 according to an embodiment of the present invention.

Figure 13A:
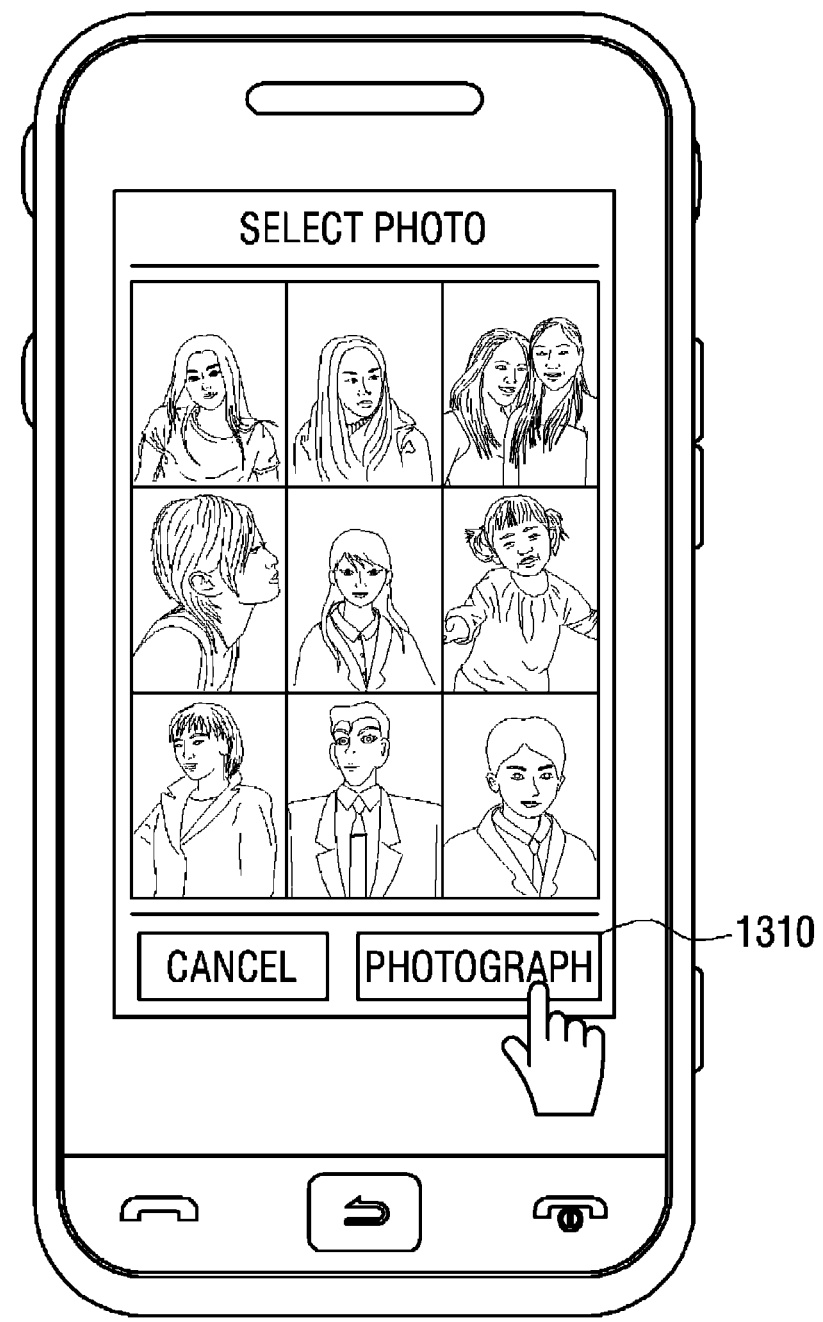
FIGS. 13A to 13D illustrate a process of taking a photo and registering the photo in user information of an image pickup apparatus 100 according to an embodiment of the present invention.
Figure 13B:
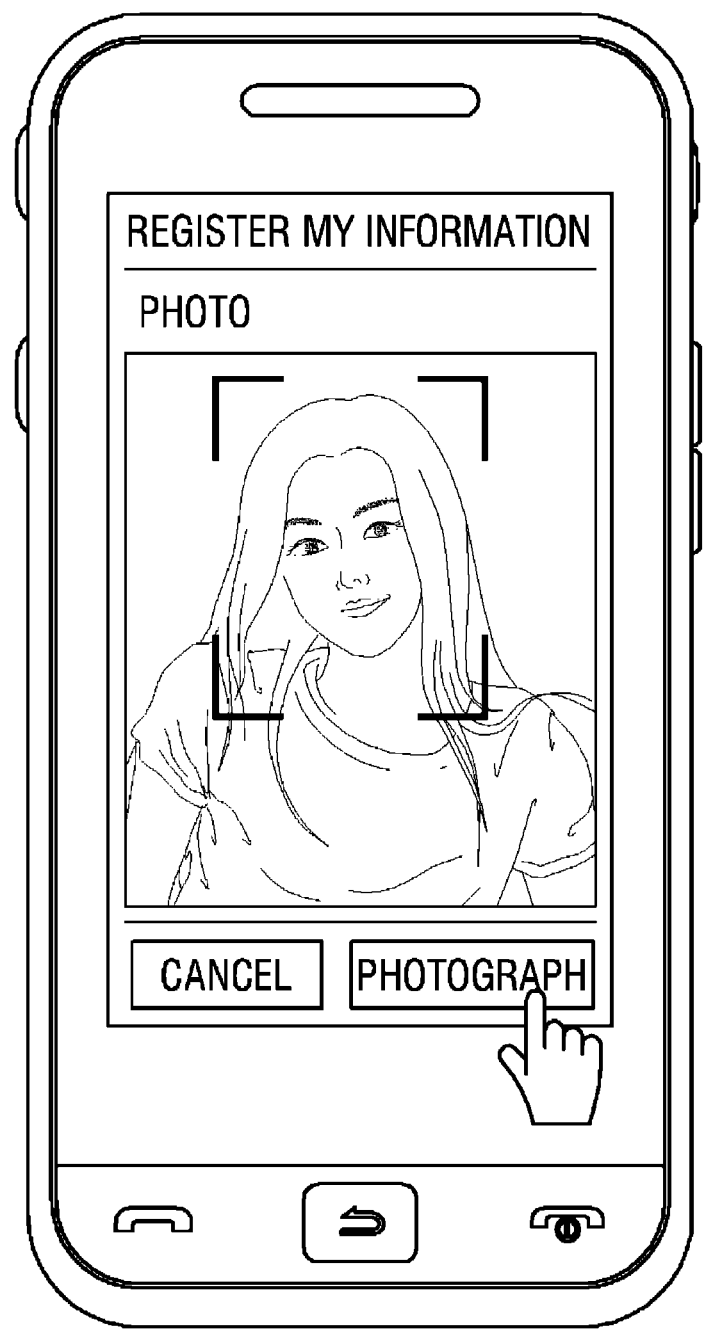

After the processes illustrated in FIGS. 12A to 12C are performed, if a user touches a photograph button 1310, the image pickup apparatus 100 executes a photographing mode as illustrated in FIG. 13A. If the user photographs the face of a specific person, the image pickup apparatus 100 displays the photographed image on the screen as illustrated in FIG. 13B.

Figure 13C:
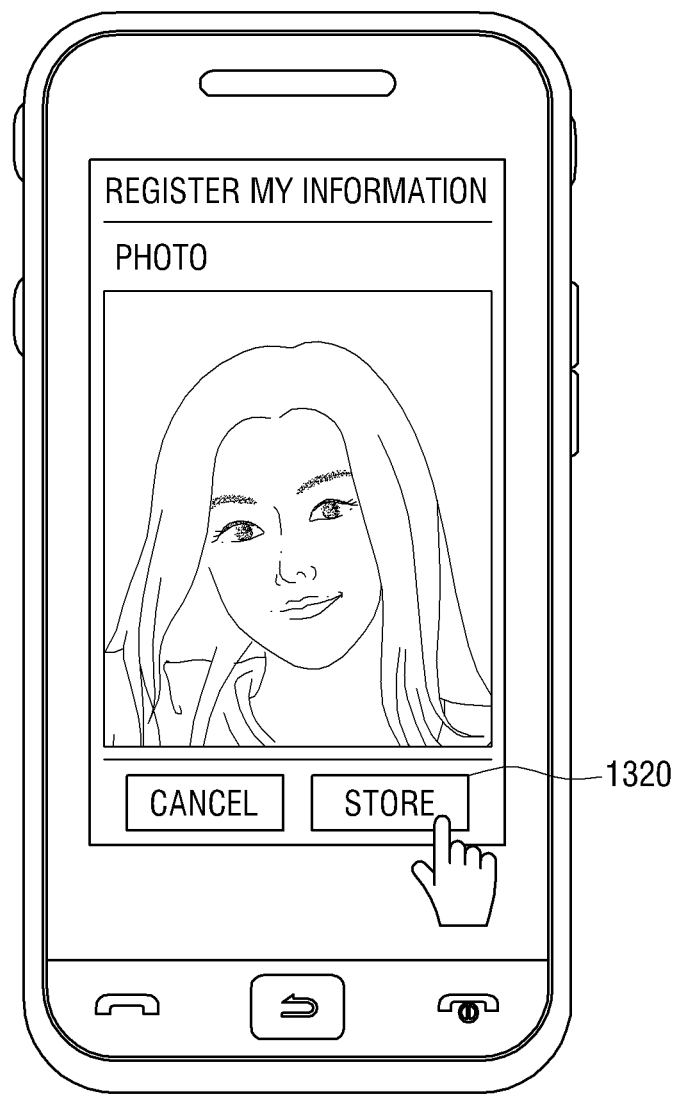
Figure 13D:
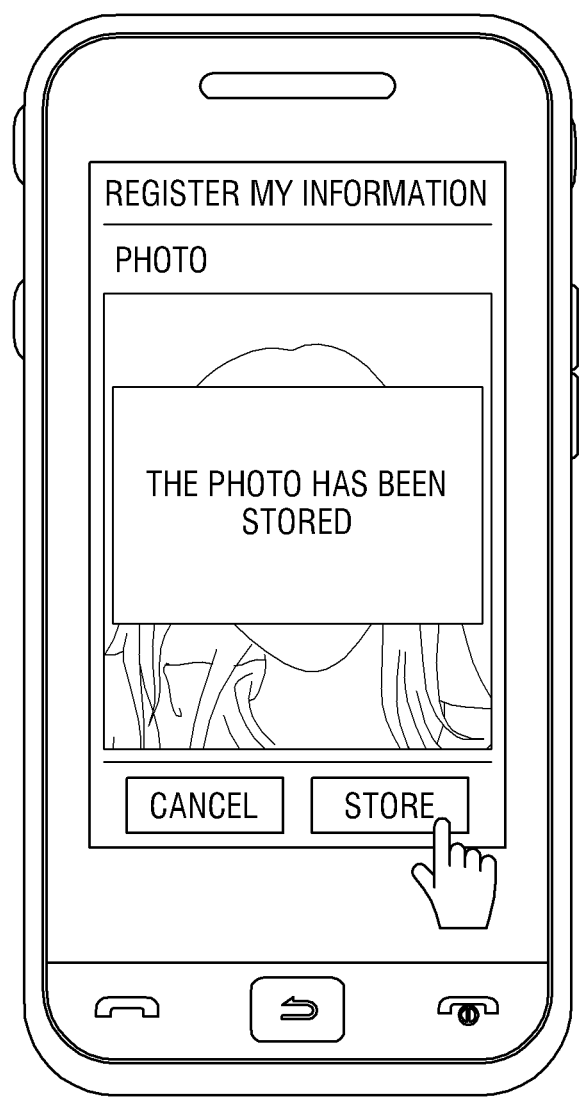

As illustrated in FIG. 13C, the image pickup apparatus 100 displays the photographed image on the screen and displays a message for confirming whether to store the image corresponding to the person selected from an address book. If the user touches the store button 1320, the image pickup apparatus 100 stores the photographed image corresponding to the user information of the image pickup apparatus 100. That is, the image pickup apparatus 100 stores the photographed image in FIG. 13C to correspond to "Kim Yu Na". If the image is stored, the image pickup apparatus 100 displays a message of confirming that the image has been stored on the screen, as in FIG. 13D.

As such, the image pickup apparatus 100 may take a photo and register the photo corresponding to the user information of the image pickup apparatus 100 in addition to registering a photo by selecting the photo in the photo list.

Meanwhile, the image pickup apparatus 100 may provide a function related to a Social Network Service (SNS), such as for example, Twitter, Facebook, and Flickr.

Specifically, the image pickup apparatus 100 may transmit an image to an SNS site of a person whose face is recognized through face recognition. In addition, the image pickup apparatus 100 may receive a newly registered image from the SNS site of a person whose face is recognized through face recognition. The image pickup apparatus 100 may also receive photos of a person whose face is recognized through face recognition from among photos registered in a specific SNS site.

In addition, the image pickup apparatus 100 may connect to the SNS site of a person whose face is recognized through face recognition and display the corresponding SNS site on the screen.

Through this process, a user may use an SNS more easily through face recognition of the image pickup apparatus 100.

In the above embodiments, the image pickup apparatus 100 may be any apparatus that can support a face recognition function and execute multi-media contents. For example, the image pickup apparatus 100 may be realized as a mobile phone, an MP3 player, a PDA and a notebook computer.

While the present invention has been shown and described with reference to certain embodiments thereof, it will be understood by those skilled in the art that various changes in form and detail may be made therein without departing from the spirit and scope of the invention, as defined by the appended claims.

What is claimed is:

1. An image transmitting method in a terminal, comprising:
   presenting a plurality of visual indicators corresponding to a plurality of recognized faces in an image;
   receiving a first user input for selecting a visual indicator among the plurality of visual indicators;
   in response to the first user input, searching for a name corresponding to the selected visual indicator;
   presenting the searched name corresponding to the selected visual indicator, a first face image related to the selected visual indicator, and a second face image related to the searched name, the first face image comprising a recognized face corresponding to the selected visual indicator among the plurality of recognized faces in the image, the second face image comprising an image matched to the searched name among a plurality of images stored in the terminal;
   receiving a second user input for confirming that the searched name corresponds to the first face image related to the selected visual indicator;
   in response to the second user input, presenting a menu including a plurality of selectable functions that may be performed with respect to at least one piece of contact information;
   receiving a third user input for selecting a function from the plurality of selectable functions; and
   in response to the third user input, transmitting the image based on contact information related to the selected function using the selected function.

2. The image transmitting method as claimed in claim 1, further comprising:
   displaying the image on a screen.

3. The image transmitting method as claimed in claim 1, further comprising:
   searching information regarding a person corresponding to the first face image of the selected visual indicator; and
   determining a contact based on the information regarding the person.

4. The image transmitting method as claimed in claim 3, wherein searching the information comprises:
   extracting data regarding characteristics of the first face image;
   searching a portrait photo corresponding to the extracted data regarding characteristics of the first face image; and
   extracting information regarding the person corresponding to the searched portrait photo.

5. The image transmitting method as claimed in claim 4, wherein the portrait photo and the information regarding the person are recorded in an address book stored in an internal storage medium.

6. The image transmitting method as claimed in claim 4, wherein the portrait photo and the information regarding the person are recorded in an external storage medium, and
   wherein searching the information comprises searching the portrait photo corresponding to the extracted data regarding characteristics of the first face image from the external storage medium.

7. The image transmitting method as claimed in claim 6, wherein extracting the data comprises extracting information regarding the person corresponding to the searched portrait photo from an address book stored in the external storage medium.

8. The image transmitting method as claimed in claim 1, further comprising:
   storing the image,
   wherein presenting the plurality of visual indicators comprises recognizing the plurality of faces from the image stored through photographing.

9. The image transmitting method as claimed in claim 1, further comprising:
   displaying the image photographed by an image pickup element while in a stand-by mode on the screen;

wherein presenting the plurality of visual indicators comprises recognizing the plurality of faces from the image photographed by the image pickup element while in the stand-by mode.

10. The image transmitting method as claimed in claim 1, wherein transmitting the image comprises transmitting the image to at least one e-mail address corresponding to the first face image of the selected visual indicator.

11. The image transmitting method as claimed in claim 1, further comprising:
receiving user information from an external apparatus;
searching contents corresponding to the received user information; and
transmitting the searched contents to the external apparatus.

12. The image transmitting method as claimed in claim 11, wherein searching the contents comprises searching one of photo contents and video contents including a face of a user of the external apparatus with reference to the user information.

13. The image transmitting method as claimed in claim 11, wherein searching the contents comprises:
searching a portrait photo of a user corresponding to the user information in an address book;
extracting data regarding characteristics of a user face from the searched portrait photo of the user; and
searching one of photo contents and video contents including the user face based on the data regarding characteristics of the user face.

14. The image transmitting method as claimed in claim 11, further comprising:
transmitting a list of contents corresponding to the user information; and
receiving contents selection information from the external apparatus,
wherein transmitting the searched contents comprises transmitting the searched contents selected based on the received contents selection information from the list of contents to the external apparatus.

15. A photographing apparatus, comprising:
a display unit configured to present a plurality of visual indicators corresponding to a plurality of recognized faces in an image;
a communication unit configured to receive a first user input for selecting a visual indicator among the plurality of visual indicators; and
a controller configured to in response to the first user input, search for a name corresponding to the selected visual indicator, present the searched name corresponding to the selected visual indicator, a first face image related to the selected visual indicator, and a second face image related to the searched name, the first face image comprising a recognized face corresponding to the selected visual indicator among the plurality of recognized faces in the image, the second face image comprising an image matched to the searched name among a plurality of images stored in the terminal, receive a second user input for confirming that the searched name corresponds to the first face image related to the selected visual indicator, in response to the second user input, present a menu including a plurality of selectable functions that may be performed with respect to at least one piece of contact information, receive a third user input for selecting a function from the plurality of selectable functions, and in response to the third user input, transmit the image contact information related to the selected function using the selected function.

16. The photographing apparatus as claimed in claim 15, wherein:
the display unit is further configured to display the image on a screen.

17. The photographing apparatus as claimed in claim 16, wherein the controller is further configured to search information regarding a person corresponding to the first face image of the selected visual indicator, and determine a contact based on the information regarding the person.

18. The photographing apparatus as claimed in claim 17, further comprising an image processing unit configured to extract data regarding characteristics of the first face image, and
wherein the controller is further configured to search a portrait photo corresponding to the extracted data regarding characteristics of the first face image and extract the information regarding the person corresponding to the portrait photo.

19. The photographing apparatus as claimed in claim 18, wherein the portrait photo and the information regarding the person are recorded in an address book stored in an internal storage medium.

20. The photographing apparatus as claimed in claim 18, wherein the portrait photo and the information regarding the person are recorded in an external storage medium, and
wherein the controller is further configured to search the portrait photo corresponding to the extracted data regarding characteristics of the first face image from the external storage medium.

21. The photographing apparatus as claimed in claim 20, wherein the controller is further configured to extract information regarding the person corresponding to the searched portrait photo from an address book stored in the external storage medium.

22. The photographing apparatus as claimed in claim 15, further comprising:
a storage unit that stores the image; and
an image processing unit configured to recognize the plurality of faces from the image stored through photographing.

23. The photographing apparatus as claimed in claim 15, wherein:
the display unit is further configured to display the image photographed by the image pickup element while in a stand-by mode on the screen; and
further comprising an image processing unit configured to recognize the plurality of faces from the image photographed by the image pickup element while in the stand-by mode.

24. The photographing apparatus as claimed in claim 15, wherein the controller is further configured to control to transmit the image to at least one e-mail address corresponding to the first face image of the selected visual indicator.

25. The photographing apparatus as claimed in claim 15, wherein the controller is further configured to receive user information from the external apparatus, search contents corresponding to the received user information, and transmit the searched contents to the external apparatus.

26. The photographing apparatus as claimed in claim 25, wherein the controller is further configured to search one of photo contents and video contents including a face of a user of the external apparatus with reference to the user information.

27. The photographing apparatus as claimed in claim 25, wherein the controller is further configured to search a portrait photo of a user corresponding to the user information in an address book, extract data regarding characteristics of a user face from the searched portrait photo of the user, and search one of photo contents and video contents including the user face based on the data regarding characteristics of the user face.

28. The photographing apparatus as claimed in claim 25, wherein the controller is further configured to generate a list of contents corresponding to the user information and transmit the generated list of contents to the external apparatus, receive contents selection information from the external apparatus, and transmit the searched contents selected based on the received contents selection information from among the list of contents to the external apparatus.

29. The image transmitting method as claimed in claim 1, further comprising:
   searching contact information regarding a person corresponding to the first face image of the selected visual indicator in an internal storage of the terminal or an external storage.

30. The image transmitting method as claimed in claim 1, wherein the first user input comprises a user's touch for selecting the visual indicator among the plurality of visual indicators.

31. The photographing apparatus as claimed in claim 15, wherein the first user input comprises a user's touch for selecting the visual indicator among the plurality of visual indicators.

\* \* \* \* \*